(12) United States Patent
Karaki et al.

(10) Patent No.: US 6,704,999 B2
(45) Date of Patent: Mar. 16, 2004

(54) METHOD OF AND APPARATUS FOR PROCESSING PHOTOGRAPHIC PHOTOSENSITIVE FILM

(75) Inventors: Hideyuki Karaki, Kanagawa-ken (JP); Chiaki Suzuki, Kanagawa-ken (JP); Yoshinobu Misumi, Kanagawa-ken (JP); Takayuki Kambara, Kanagawa-ken (JP); Susumu Sato, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 10/247,509

(22) Filed: Sep. 20, 2002

(65) Prior Publication Data

US 2003/0026618 A1 Feb. 6, 2003

Related U.S. Application Data

(62) Division of application No. 09/881,760, filed on Jun. 18, 2001, now Pat. No. 6,490,783, which is a division of application No. 09/163,912, filed on Oct. 1, 1998, now Pat. No. 6,317,951.

(30) Foreign Application Priority Data

| | | |
|---|---|---|
| Oct. 2, 1997 | (JP) | 9-270153 |
| Oct. 6, 1997 | (JP) | 9-272861 |
| Oct. 30, 1997 | (JP) | 9-298291 |

(51) Int. Cl.$^7$ ............................................. B23Q 15/00
(52) U.S. Cl. .............................. 29/714; 29/712; 29/806; 29/407.01; 29/407.05; 53/72
(58) Field of Search ...................... 29/710, 712, 714, 29/806, 705, 706, 708, 407.01, 407.04, 407.05, 407.1, 402.01; 53/53, 54, 55, 64, 65, 67, 72, 118, 430; 242/534; 340/675

(56) References Cited

U.S. PATENT DOCUMENTS

| | | |
|---|---|---|
| 2,776,094 A | 1/1957 | Edwards et al. |
| 2,940,232 A | 6/1960 | Wallace et al. |
| 3,013,459 A | 12/1961 | Coleman |
| 3,457,627 A | 7/1969 | Napor et al. |
| 3,581,371 A | 6/1971 | Bushey |
| 3,693,430 A | 9/1972 | Menary |
| 3,724,162 A * | 4/1973 | Lorenzini et al. ............... 53/53 |
| 3,748,715 A | 7/1973 | Hoover et al. |
| 3,759,095 A | 9/1973 | Short Jr., et al. |

(List continued on next page.)

FOREIGN PATENT DOCUMENTS

| | | | |
|---|---|---|---|
| EP | 0 584 583 A2 | 3/1994 | |
| EP | 0 587 447 A1 | 3/1994 | |
| EP | 0 783 131 A2 | 7/1997 | |
| JP | 6203664 A * | 2/1987 | ............ G03C/3/00 |
| JP | 62039708 A * | 2/1987 | ............ G01B/21/00 |
| JP | 362040451 A * | 2/1987 | ............ G03C/3/00 |
| JP | 5-55022 | 8/1993 | |
| JP | 6-266059 | 9/1994 | |
| JP | 409118393 A * | 5/1997 | ............ B67B/3/26 |

*Primary Examiner*—Peter Vo
*Assistant Examiner*—Essama Omgba
(74) *Attorney, Agent, or Firm*—Sughrue Mion, PLLC

(57) ABSTRACT

When any of facilities of a film producing and packaging system suffers a failure, a film processing controller shuts off the film producing and packaging system. The operator repairs a failing facility and manually discharges a length of an elongate film which may possibly be defective. After the failing facility is repaired, the film processing controller is restarted to operate the film producing and packaging system, which then automatically discharges a length of the elongate film corresponding to a preset number of sized films. It is possible to easily and quickly discard a portion of the elongate film which has been made defective by the facility failure.

10 Claims, 22 Drawing Sheets

U.S. PATENT DOCUMENTS

| | | |
|---|---|---|
| 3,763,728 A | 10/1973 | Blackman |
| 3,778,802 A | 12/1973 | Wallace |
| 3,802,051 A | 4/1974 | Andler et al. |
| 3,802,052 A | 4/1974 | Andler et al. |
| 3,904,472 A | 9/1975 | Glaus |
| 3,930,296 A | 1/1976 | Hoover |
| 3,933,069 A | 1/1976 | Tall et al. |
| 3,948,125 A | 4/1976 | Hujer et al. |
| 4,115,913 A | 9/1978 | Moriya et al. |
| 4,147,080 A | 4/1979 | Diesch et al. |
| 4,205,769 A | 6/1980 | Blitchington |
| 4,221,144 A | 9/1980 | Diesch et al. |
| 4,292,115 A | 9/1981 | Jones et al. |
| 4,297,930 A | 11/1981 | Putzke |
| 4,436,008 A | 3/1984 | Strunc |
| 4,561,235 A | 12/1985 | Yanagisawa et al. |
| 4,574,563 A | 3/1986 | Shimizu |
| 4,925,119 A | 5/1990 | Shimizu et al. |
| 5,044,144 A * | 9/1991 | Foote et al. .................. 53/456 |
| 5,074,034 A * | 12/1991 | Lebbon ....................... 29/806 |
| 5,119,549 A * | 6/1992 | Foote et al. .................. 29/806 |
| 5,462,240 A | 10/1995 | Esaki et al. |
| 5,479,691 A | 1/1996 | Shimizu et al. |
| 5,543,882 A | 8/1996 | Pagano et al. |
| 5,606,842 A | 3/1997 | Sakamoto et al. |
| 5,647,113 A | 7/1997 | Hase et al. |
| 5,746,100 A | 5/1998 | Tsuzaki et al. |
| 5,860,344 A | 1/1999 | Yamamoto et al. |
| 5,913,991 A | 6/1999 | Kubota et al. |
| 6,018,929 A | 2/2000 | Suzuki et al. |
| 6,021,697 A | 2/2000 | Yamamoto et al. |
| 6,044,623 A | 4/2000 | Karaki et al. |
| 6,092,352 A | 7/2000 | Tanaka |
| 6,116,820 A | 9/2000 | Suzuki et al. |
| 6,129,303 A | 10/2000 | Karaki et al. |
| 6,141,852 A | 11/2000 | Shimizu et al. |
| 6,145,279 A | 11/2000 | Karaki et al. |
| 6,182,419 B1 | 2/2001 | Karaki et al. |
| 6,289,653 B1 | 9/2001 | Shimizu et al. |
| 6,317,951 B1 | 11/2001 | Karaki et al. |
| 6,412,162 B1 | 7/2002 | Shimizu et al. |
| 6,427,306 B2 | 8/2002 | Karaki et al. |
| 6,519,839 B1 | 2/2003 | Suzuki et al. .................. 29/806 |
| 6,591,489 B2 * | 7/2003 | Shimizu et al. ............... 29/806 |

* cited by examiner

F I G. 6
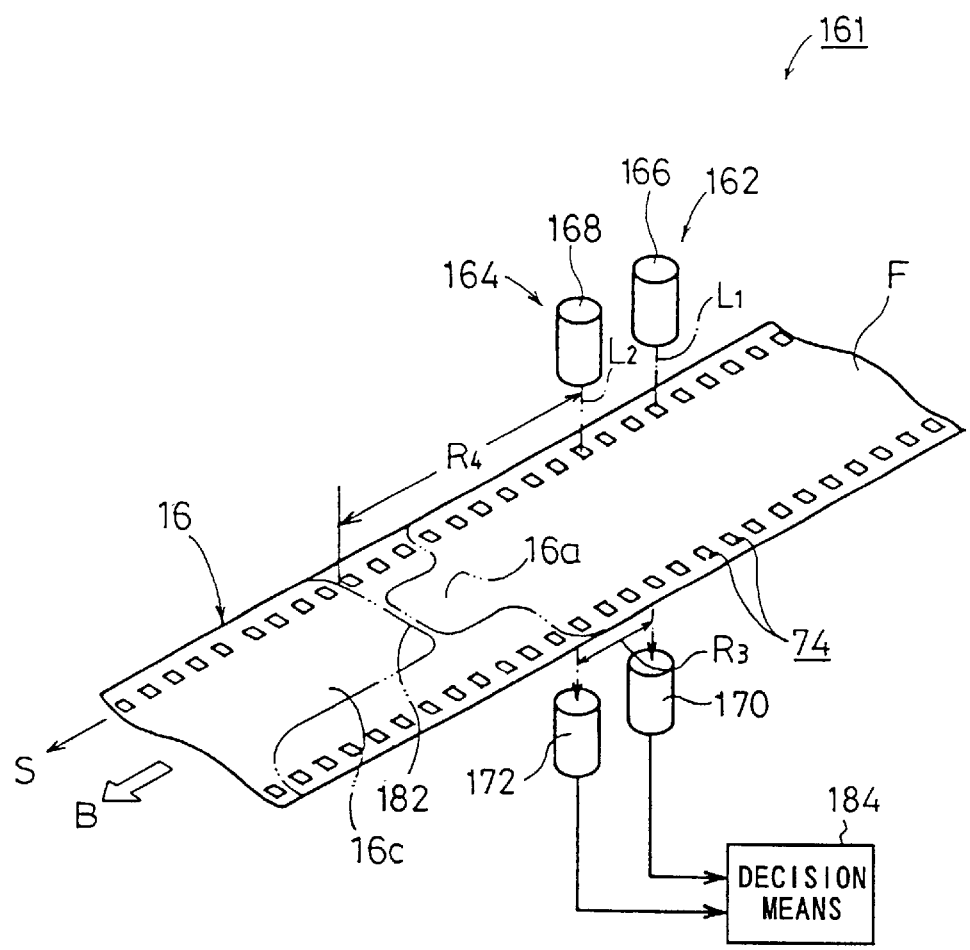

METHOD OF AND APPARATUS FOR PROCESSING PHOTOGRAPHIC PHOTOSENSITIVE FILM

This is a divisional of application Ser. No. 09/881,760 filed Jun. 18, 2001, (now U.S. Pat. No. 6,490,783, issued Dec. 10, 2002), which in turn is a divisional of application Ser. No. 09/163,912, filed Oct. 1, 1998 (now U.S. Pat. No. 6,317,951, issued Nov. 20, 2001), the entire disclosures of which are incorporated herein by reference.

BACKGROUND OF THE INVENTION

1. Field of the Invention

The present invention relates to a method of and an apparatus for processing a photographic photosensitive film in a film producing and packaging system for unreeling a film roll of elongate photographic photosensitive film, cutting the elongate photographic photosensitive film to a film of given length, winding the cut film on a spool, and placing the wound film into a film cartridge.

2. Description of the Related Art

For producing and packaging a photographic photosensitive film, it has been customary to perform various steps including the steps of producing a film of given length, winding the film, placing the wound film into a film cartridge, and inserting the film cartridge into a case.

These various steps are carried out by a facility comprising a film supply unit for unwinding a film roll and cutting the unwound film to a film of given length, a film coiling unit for coiling the film of given length on a spool thereby to produce a film coil, a cartridge producing unit for staking a cap on an end of a tubular cartridge blank sheet thereby to produce a cartridge with one open end, an assembling unit for inserting the film coil into the cartridge and staking another cap on the open end of the cartridge thereby to produce an assembled cartridge, and an encasing unit for placing the assembled cartridge into a case and attaching a case cap on an open end of the case thereby to produce a packaged product.

If the above facility stops its operation due to any of various failures or there is a leakage of light into a dark room in the facility, then the photographic photosensitive film tends to be made defective, e.g., damaged or exposed to light. When a certain photographic photosensitive film is made defective, it has been the customary practice for the operator to discard all photographic photosensitive films in the same batch as the defective photographic photosensitive film. However, this practice is highly uneconomical.

There has been known a process, as disclosed in Japanese laid-open patent publication No. 6-266059, of detecting whether a photographic photosensitive film is acceptable or not, shifting a defective film signal indicative of any detected defective photographic photosensitive film in synchronism with the movement of the photographic photosensitive film, and, when the defective film signal is shifted in association with a switching position for a delivery path capable of discharging a photographic photosensitive film out of the system, switching the delivery path to automatically discharge a defective photographic photosensitive film out of the system.

Depending on the facility suffering a failure or the details of such a failure, a photographic photosensitive film may be subjected to a defect in a substantially long range, and it is highly time-consuming to automatically discharge a long defective film. Furthermore, if a photographic photosensitive film is twisted or jammed due to a failure of the film delivery system, then the photographic photosensitive film cannot be delivered smoothly along the delivery path.

The elongate photographic photosensitive film unreeled from the film roll has a plurality of perforations defined at spaced intervals in side edges thereof. When the photographic photosensitive film is to be trimmed after it has been fed to a cutting position by a predetermined length, one of the perforations may possibly be located in the cutting position. An end of the photographic photosensitive film which is to be trimmed in the cutting position will serve as a tongue of given length that projects out of an assembled cartridge. If a perforation in the film is positioned at the leading end of the tongue, then it tends to cause trouble when the film is wound in a camera. Consequently, the cartridge whose film tongue has a perforation in its leading end is poor in quality and is not acceptable as a marketable product. Because the possibility that a perforation in the film will be positioned at the leading end of the tongue is high, the percentage of defective assembled cartridges is large. This is not economical since a number of expensive cartridges have to be discarded.

Assembled cartridges produced by the assembling unit are tested by pulling projecting film ends, i.e., tongues, to measure the resistance to the pull. Japanese patent publication No. 5-55022, for example, discloses a device for measuring the resistance to the action to pull a projecting film end from an assembled cartridge.

According to the disclosed device, while an assembled cartridge is being held by an inspection turret which is continuously rotated, the resistance to the action to pull a projecting film end from the assembled cartridge is measured by a measuring unit associated with a film pulling mechanism. The measuring unit measures the resistance while the assembled cartridge is being continuously delivered.

When assembled cartridges are produced by the assembling unit, they are inspected in various tests in addition to the measurement of the resistance to the film end pulling action. For example, assembled cartridges are inspected to check if a cap is staked on an open end of the cartridge in which a film coil has been inserted, and also to check if the cap is properly staked on the open end.

Such inspecting processes need to be carried out independently in respective stations in the assembling unit. Accordingly, the assembling unit requires a relatively large working space and is highly complex in structure. Because the inspecting processes are considerably time-consuming, they are not efficient to perform.

SUMMARY OF THE INVENTION

It is a general object of the present invention to provide a method of processing a photographic photosensitive film in a manner to be able to easily and quickly discard unacceptable portions of the photographic photosensitive film which are defective due to facility failures.

A major object of the present invention is to provide an apparatus for processing a photographic photosensitive film in a manner to be able to reliably discard, with a simple arrangement, defective film portions including joints between photographic photosensitive films.

Another major object of the present invention is to provide a method of and an apparatus for processing a photographic photosensitive film while reliably and easily detecting, with a simple arrangement, whether a perforation defined in a side edge of the photographic photosensitive film is located in a cutting position or not, when films of given length are produced from the photographic photosensitive film that is unreeled from a film roll.

Still another major object of the present invention is to provide a method of and an apparatus for processing a photographic photosensitive film while efficiently performing various inspecting processes including a process of measuring the resistance to a pull on the photographic photosensitive film, in a reduced space and with a simple arrangement.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a perspective view of a perforation position inspecting device for carrying out the method of processing a photographic photosensitive film;

DETAILED DESCRIPTION OF THE PREFERRED EMBODIMENTS

Figure 1:
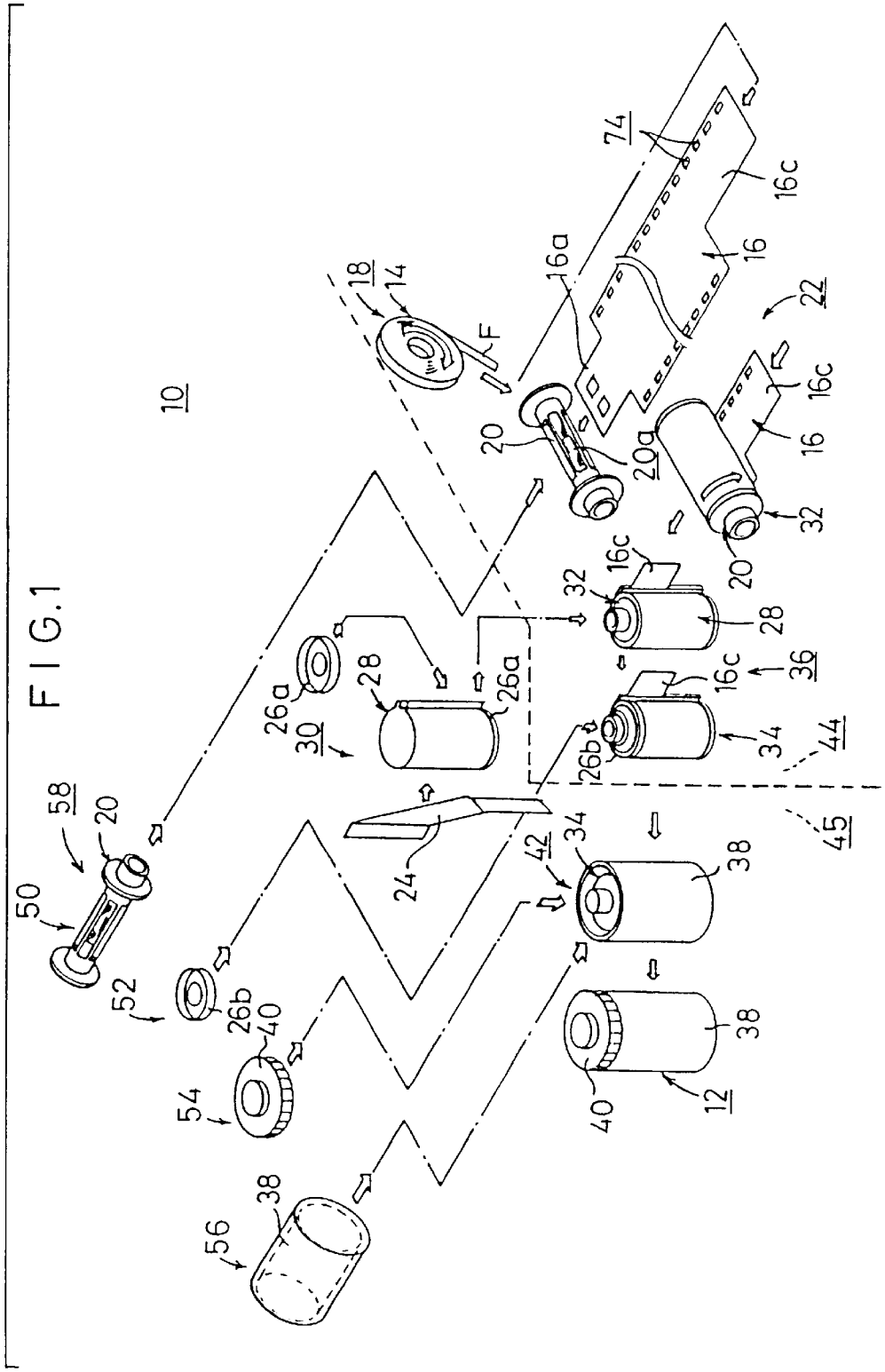
FIG. 1 is a schematic perspective view illustrative of the manner in which a packaged product is manufactured by a film producing and packaging system which carries out a method of processing a photographic photosensitive film according to a first embodiment of the present invention.

FIG. 1 illustrates in schematic perspective the manner in which a packaged product 12 is manufactured by a film producing and packaging system 10 which carries out a method of processing a photographic photosensitive film according to a first embodiment of the present invention. The film producing and packaging system 10 is shown in plan and side elevation views in FIGS. 2 and 3, respectively.

Figure 2:
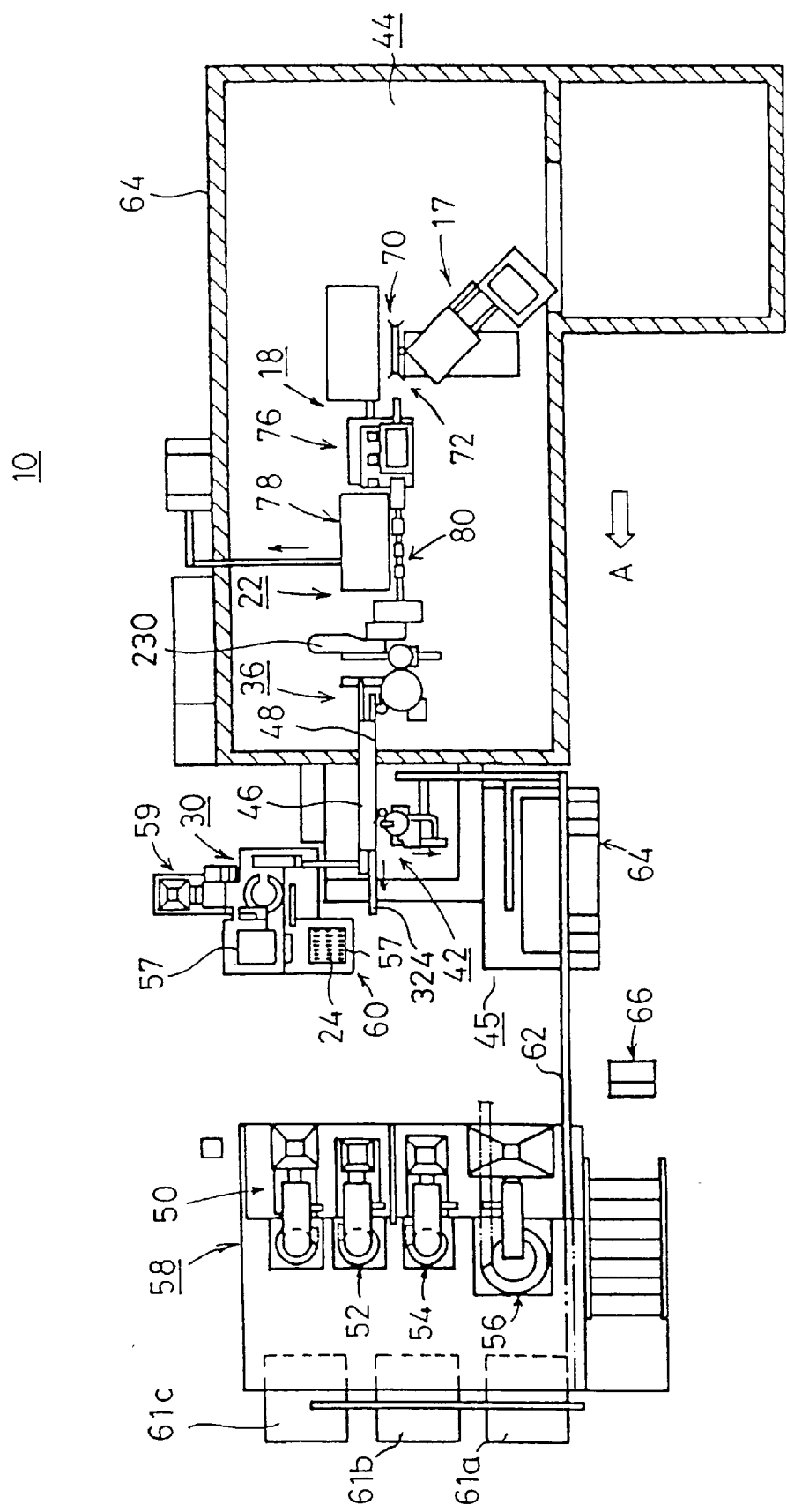
FIG. 2 is a schematic plan view of the film producing and packaging system.
Figure 3:
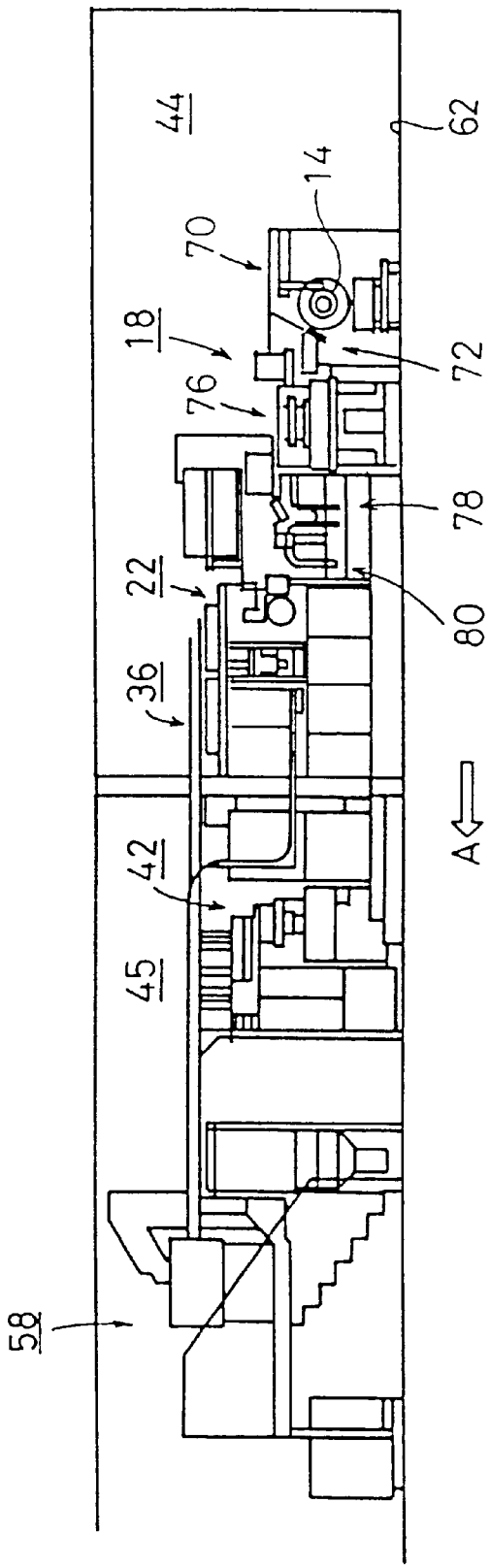
FIG. 3 is a schematic side elevational view of the film producing and packaging system.

As shown in FIGS. 1 through 3, the film producing and packaging system 10 generally comprises a film roll storage unit 17 for storing a film roll 14 of elongate photographic photosensitive film F (hereinafter referred to as elongate film F), a film supply unit 18 for unwinding the film roll 14, cutting the unwound elongate film F into a sized film 16 of given length, and supplying the sized film 16, a film coiling unit 22 for positioning a spool 20 and the sized film 16 relatively to each other and winding the sized film 16 on the spool 20, a cartridge producing unit 30 for rounding a cartridge blank sheet 24 into a tubular form and staking a cap 26a on one end of the tubular form thereby to produce a cartridge 28 with one open end, an assembling unit 36 for inserting a film coil 32, which is made up of the sized film 16 wound on the spool 20, into the cartridge 28 through the open end thereof, and then staking another cap 26b on the open end of the cartridge 28 thereby to produce an assembled cartridge 34, and an encasing unit 42 for placing the assembled cartridge 34 into a case 38 and attaching a case cap 40 to an open end of the case 38 thereby to produce a packaged product 12. The film supply unit 18, the film coiling unit 22, and the assembling unit 36 are housed in a dark room 44, and other devices, i.e., the encasing unit 42, etc. are housed in a bright room 45.

As shown in FIG. 2, the film supply unit 18, the film coiling unit 22, the assembling unit 36, and encasing unit 42 are arrayed in line with each other along a film producing and packaging process as indicated by the arrow A. Between the dark room 44 and the bright room 45, there extend a first straight feed path 46 for delivering cartridges 28 from the cartridge producing unit 30 to the assembling unit 36 and a second straight feed path 48 for delivering assembled cartridges 34 from the assembling unit 36 to the encasing unit 42.

Downstream of the film producing and packaging process, there is disposed a parts supply apparatus 58 comprising a spool supply unit 50 for supplying spools 20 to the film coiling unit 22, a cap supply unit 52 for supplying caps 26b to the assembling unit 36, a case cap supply unit 54 for supplying case caps 40 to the encasing unit 42, and a case supply unit 56 for supplying cases 38 to the encasing unit 42. The spool supply unit 50, the cap supply unit 52, the case cap supply unit 54, and the case supply unit 56 are closely positioned in the housing of the parts supply apparatus 58.

A cap supply unit 59 for supplying caps 26a and a cartridge blank sheet supply unit 60 for supplying cartridge blank sheets 24 on a pallet 57 are disposed near the cartridge producing unit 30.

Packaged product accumulating units 61a, 61b, 61c are disposed near the parts supply apparatus 58. The packaged product accumulating units 61a, 61b, 61c and the encasing unit 42 are coupled to each other by a conveyor 62 which is associated with a semifinished product accumulating unit 64. A control console 66 is disposed near the conveyor 62.

Figure 4:
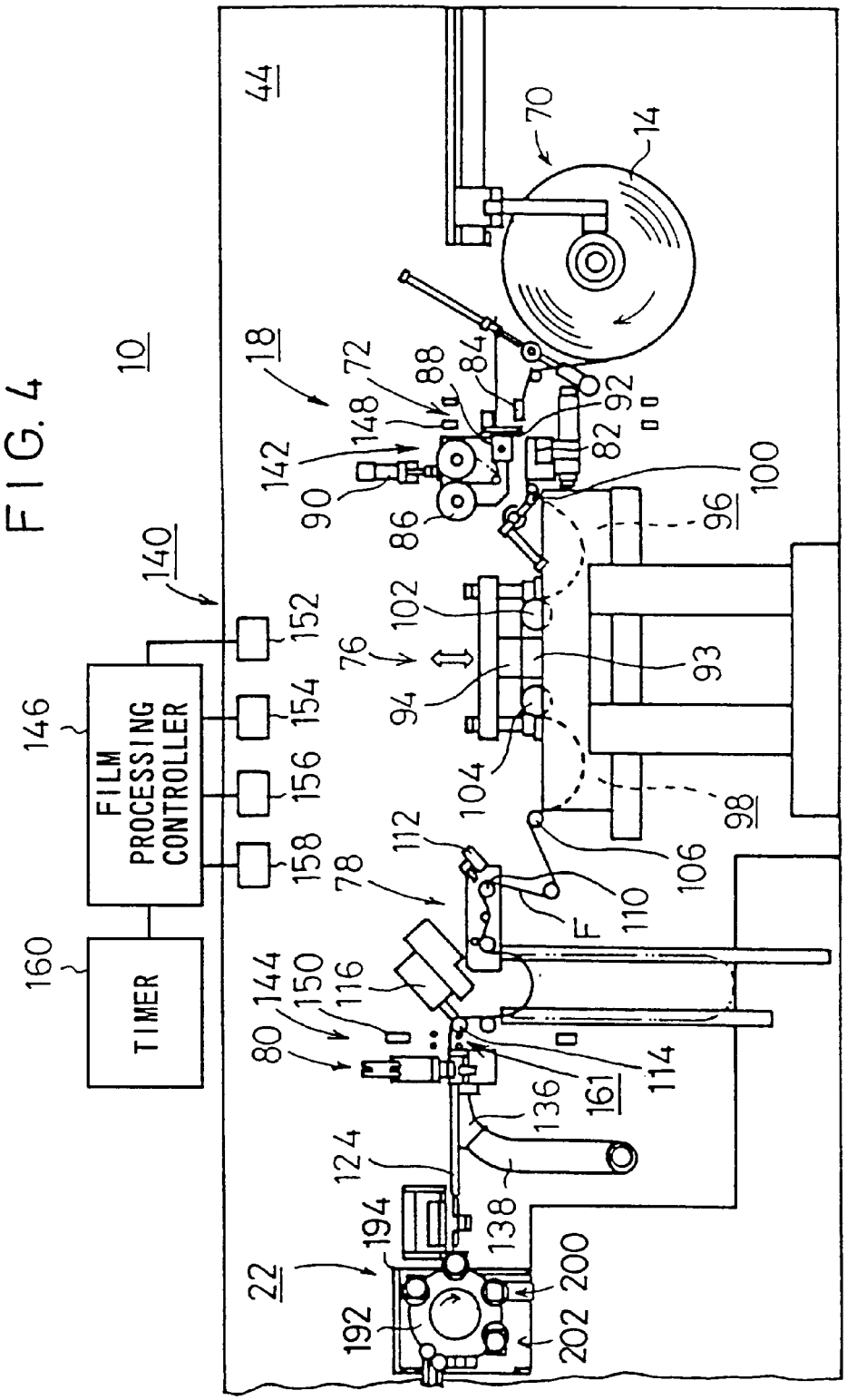
FIG. 4 is a side elevational view of a film supply unit of a film processing apparatus for carrying out the method of processing a photographic photosensitive film.
Figure 5:
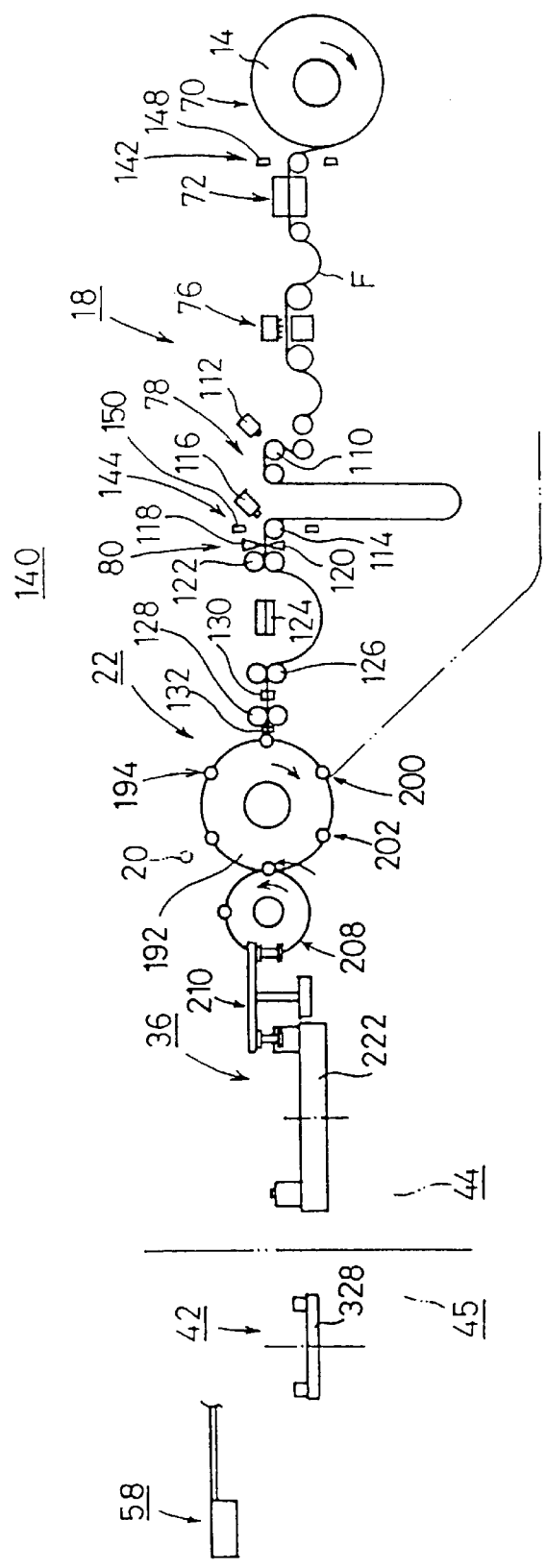
FIG. 5 is a schematic side elevational view of a succession of units ranging from the film supply unit to an assembling unit of the film producing and packaging system.

As shown in FIGS. 4 and 5, the film supply unit 18 comprises a feeder 70 for holding and unwinding a film roll 14, a splicer 72 for splicing a trailing end of the film roll 14 to a leading end of a new film roll 14, a perforator (perforating means) 76 forming perforations 74 (see FIG. 1) in opposite longitudinal sides of an elongate film F unwound from the film roll 14, a side printer 78 for printing latent image data on one or both of the sides of the elongate film F, and a cutter (cutting mechanism) 80 for cutting off the elongate film F to films 16 of given length.

The splicer 72 comprises a splicing base 82 for attracting and holding the trailing end of an elongate film F and an auxiliary base 84 for attracting and holding the leading end of a new elongate film F. The splicer 72 also has a rotatable application base 88 of square cross section for feeding a splicing tape 86, which comprises a double-sided adhesive tape, a predetermined length in each feed cycle. The application base 88 is positioned above the splicing base 82 and vertically movable in unison with a tape cutter 92 by a cylinder 90.

The perforator 76 has a fixed die block 93 and a punch block 94 disposed upwardly of the die block 93 and vertically movable by an actuator (not shown) positioned below the die block 93. The perforator 76 also has a pair of suction chambers 96, 98 disposed respectively upstream and downstream of the punch block 94. A path roller 100 and a feed roller 102 are intermittently rotatably positioned upwardly of the suction chamber 96, and a sprocket roller 104 and a path roller 106 are intermittently rotatably positioned upwardly of the suction chamber 98.

The side printer 78 comprises a first printing mechanism 112 disposed in confronting relationship to a constant-speed-feed path roller 110 and a second printing mechanism 116 disposed in confronting relationship to a constant-length-feed path roller 114. The first printing mechanism 112 records a web-shaped print depending on the type of the film as a latent image on one or both sides of elongate films F, and the second printing mechanism 116 records a DX bar code, frame numbers, frame number bar codes, a commercial name, depending on the size of the film as latent images on one or both sides of elongate films F.

As shown in FIG. 5, the cutter 80 comprises a movable blade 118 and a fixed blade 120 which are disposed in vertically spaced and confronting relationship to each other, and cut the elongate film F to a predetermined length as a sized film 16 depending on the desired size of the sized film 16. Downstream of the cutter 80, there are disposed end feed nip rollers 122, an openable and closable guide 124, insertion roller pairs 126, 128, and guide plates 130, 132. The openable and closable guide 124 is retractable out of the film feed path. As shown in FIG. 4, a discharge port (discharge mechanism) 136 is disposed below the openable and closable guide 124 for discharging a defective film. The discharge port 136 is connected through a pipe 138 to a discharge box (not shown), and is movable in directions normal to the sheet of FIG. 4.

As shown in FIGS. 4 and 5, the film supply unit 18 incorporates a discharge device 140 which serves as a film processor. The discharge device 140 comprises the splicer 72, a trailing end position detector (trailing end position detect mechanism) 142 for detecting the trailing end of an elongate film F fully unreeled from a film roll 14 disposed closely upstream of the splicer 72, the discharge port 136, a splicing detector (splicing detecting mechanism) 144 disposed upstream of the cutter 80 for detecting a spliced region of elongate films F, and a film processing controller (control mechanism) 146 for discharging a preset number of elongate films F from the discharge port 136 based on a signal from the splicing detector 144. The trailing end position detector 142 and the splicing detector 144 have respective infrared photosensors 148, 150.

The film supply unit 18 has various detecting means for detecting various failures in the respective devices thereof. Specifically, as shown in FIG. 4, the perforator 76 has a first detecting means 152 for detecting failures produced in the perforating process, e.g., a loop failure and a bottom-dead-center failure, and the side printer 78 has a second detecting means 154 for detecting failures such as an encoder wire disconnection. A third detecting means 156 for detecting path failures such as a tension roller position failure is disposed on the film feed path of the film supply unit 18. A photosensor 158 for detecting when the dark room 44 is in a bright condition is disposed in the dark room 44.

The first, second, and third detecting means 152, 154, 156 and the photosensor 158 are connected to the film processing controller 146, to which there is connected a timer 160 for measuring a shutdown time for the facilities.

A film perforation position inspecting device 161 is disposed closely upstream of the cutter 80. As shown in FIG. 6, the film perforation position inspecting device 161 comprises first and second inspecting means 162, 164 arranged along a passage S and directed toward the passage S, for applying first and second inspecting beams L1, L2 of light to the passage S. The perforations 74 defined in one side of the elongate film F unreeled from the film supply unit 18 in the direction indicated by the arrow B move along the passage S.

The first and second inspecting means 162, 164 comprise respective first and second infrared photosensors which comprise respective first and second light-emitting elements 166, 168 for applying the respective first and second inspecting beams L1, L2, which are infrared radiations, to the passage S, and respective first and second light-detecting elements 170, 172 positioned in confronting relation to the first and second light-emitting elements 166, 168, respectively, across the elongate film F.

Figure 7:
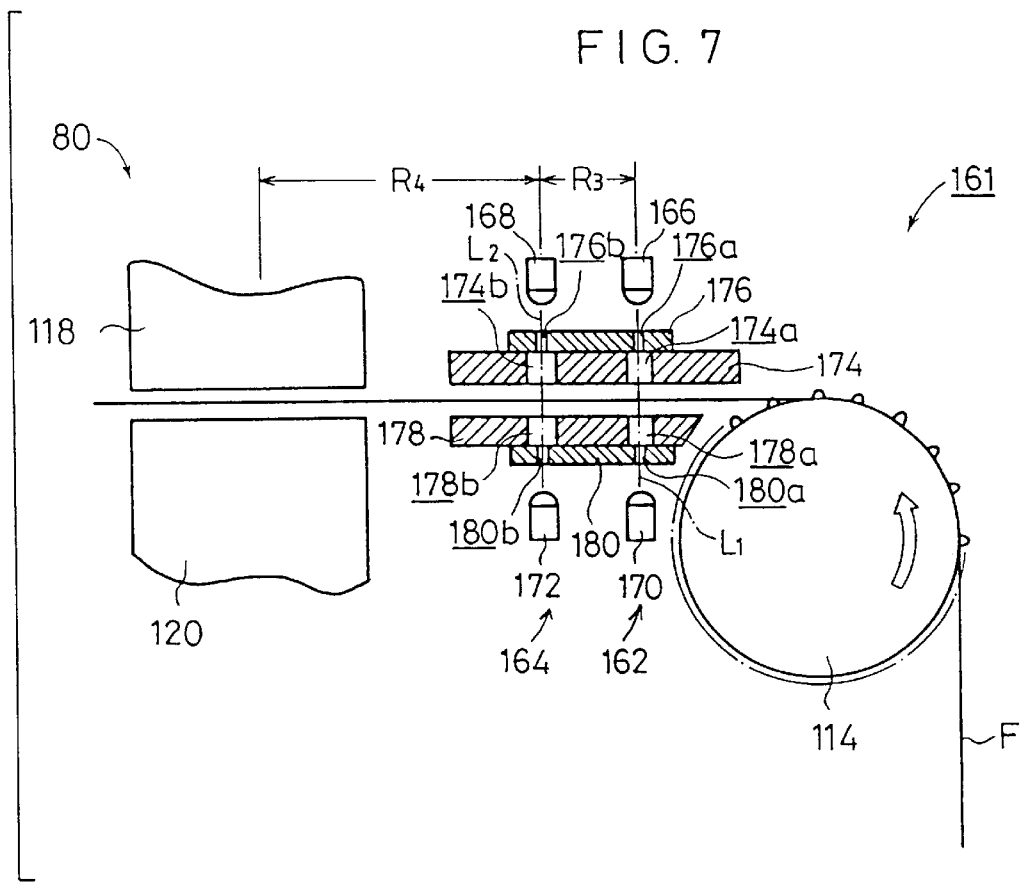
FIG. 7 is a vertical cross-sectional view of the perforation position inspecting device.

As shown in FIG. 7, an upper film guide 174 and an upper slit plate 176 are disposed below the first and second light-emitting elements 166, 168, and a lower film guide 178 and a lower slit plate 180 are disposed above the first and second light-detecting elements 170, 172. The upper film guide 174 and the lower film guide 178 have first and second holes 174a, 178a, 174b, 178b for passing the first and second inspecting beams L1, L2, and the upper slit plate 176 and the lower slit plate 180 have first and second holes 176a, 180a, 176b, 180b.

Figure 8:
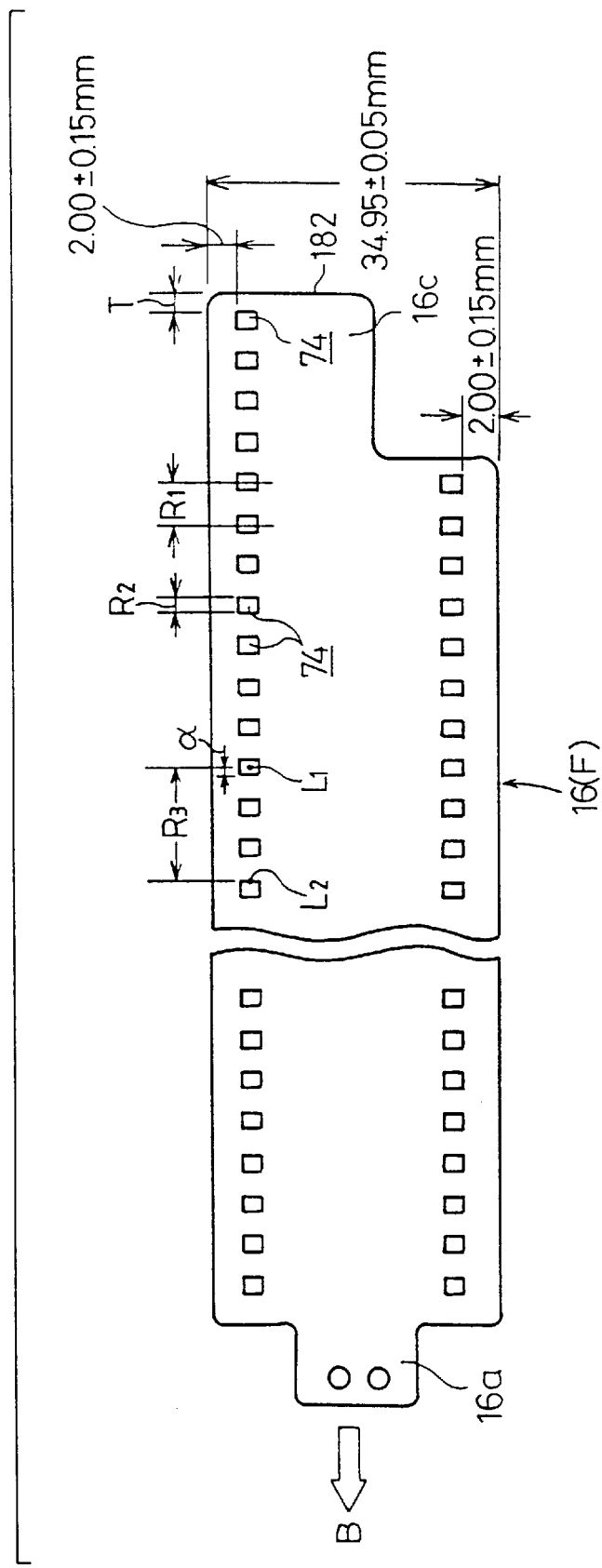
FIG. 8 is a plan view of a film of given length, showing first and second inspecting beams emitted from respective first and second inspecting units of the perforation position inspecting device.

The elongate film F has a thickness of 140 μm, and various dimensions as shown in FIG. 8. Specifically, adjacent ones of the perforations 74 are spaced from each other by a distance R1 of 4.75±0.03 mm, and each of the perforations 74 has a length R2 of 1.98±0.02 mm. The end 182 of a trailing end (so-called "tongue") 16c of the sized film 16 is spaced from a closer end 182 of the first perforation 74 by a distance T of 1.50±0.60 mm. The first and second inspecting beams L1, L2 are spaced from each other by a distance R3 of 4.75 n−R2+α mm. The end 182 of the trailing end 16c of the sized film 16 is spaced from the second inspecting beam L2 by a distance R4 of 4.75 n1−T+α/2 mm. "n" represents an integer established depending on the size of the first and second inspecting means 162, 164. In this embodiment, n=3 and α=1.2 mm. "n1" is an integer established depending on the size of the cutter 80 and the second inspecting means 164.

As shown in FIG. 6, the first light-emitting element 166 and the first light-detecting element 170 are positioned such that when the elongate film F is accurately positioned with respect to the cutter 80, the first inspecting beam L1 passes through one perforation 74. The second light-emitting element 168 and the second light-detecting element 172 are positioned such that when the elongated film F is accurately positioned with respect to the cutter 80, the second inspecting beam L2 passes through a perforation 74 which is spaced two perforations away from the perforation 74 through which the first inspecting beam L1 passes.

Figure 9:
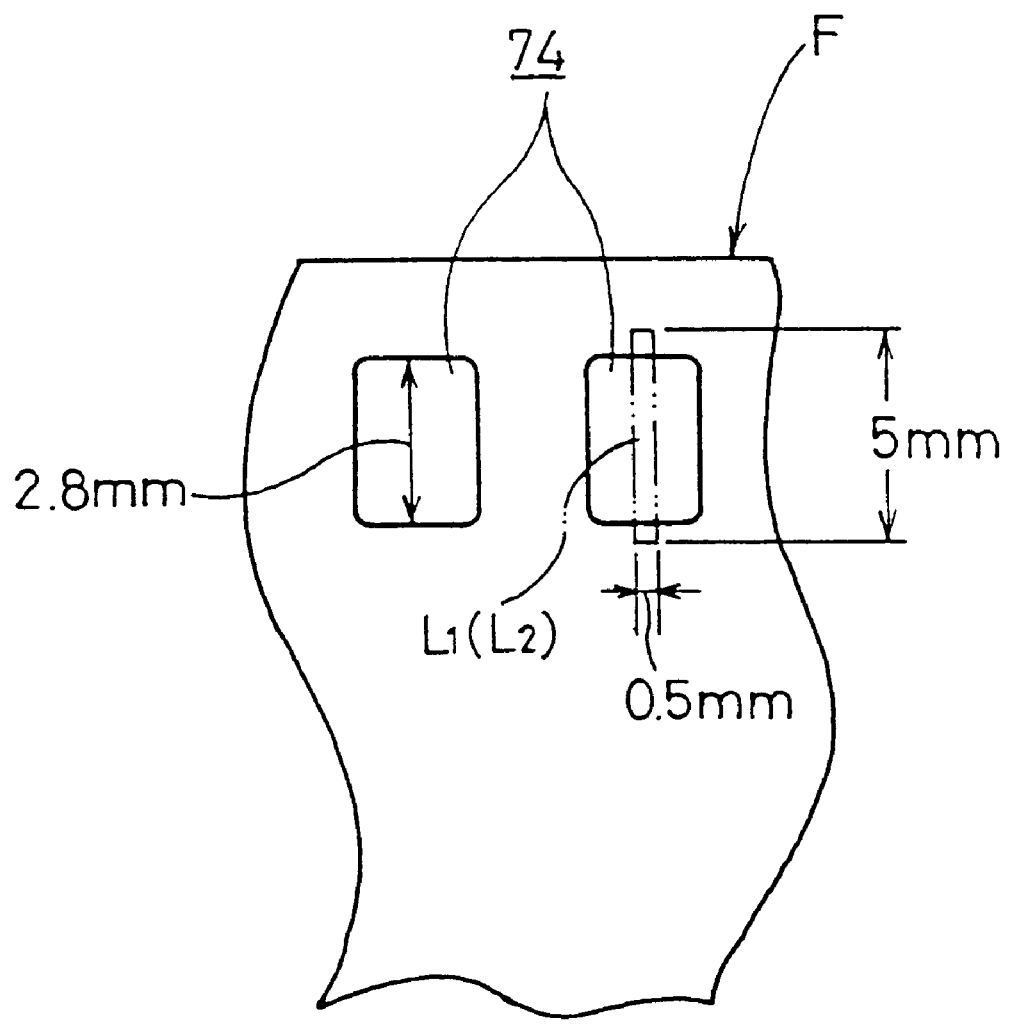
FIG. 9 is an enlarged fragmentary plan view of perforations in the film in relation to the first and second inspecting beams.

Each of the first and second inspecting beams L1, L2 has a beam diameter ranging from 1.0 mm to 1.5 mm. As shown in FIG. 9, each of the first and second inspecting beams L1, L2 is applied as a slit-like detection beam to perforations 74. The slit-like detection beam has a width of 0.5 mm and a length of 5 mm for increased detection accuracy.

The first and second light-detecting elements 170, 172 supply respective ON/OFF signals to a decision means 184. The decision means 184 determines that neither one of the perforations 74 is located on the end 182, where the elongate film F is to be severed, only when the first inspecting beam L1 passes a perforation 74 and the second inspecting beam L2 passes another perforation 74. As shown in FIG. 8, no perforation 74 is located on the end 182 insofar as the elongate film F deviates from its proper position within a distance a in a direction opposite to the direction indicated by the arrow B.

Figure 10:
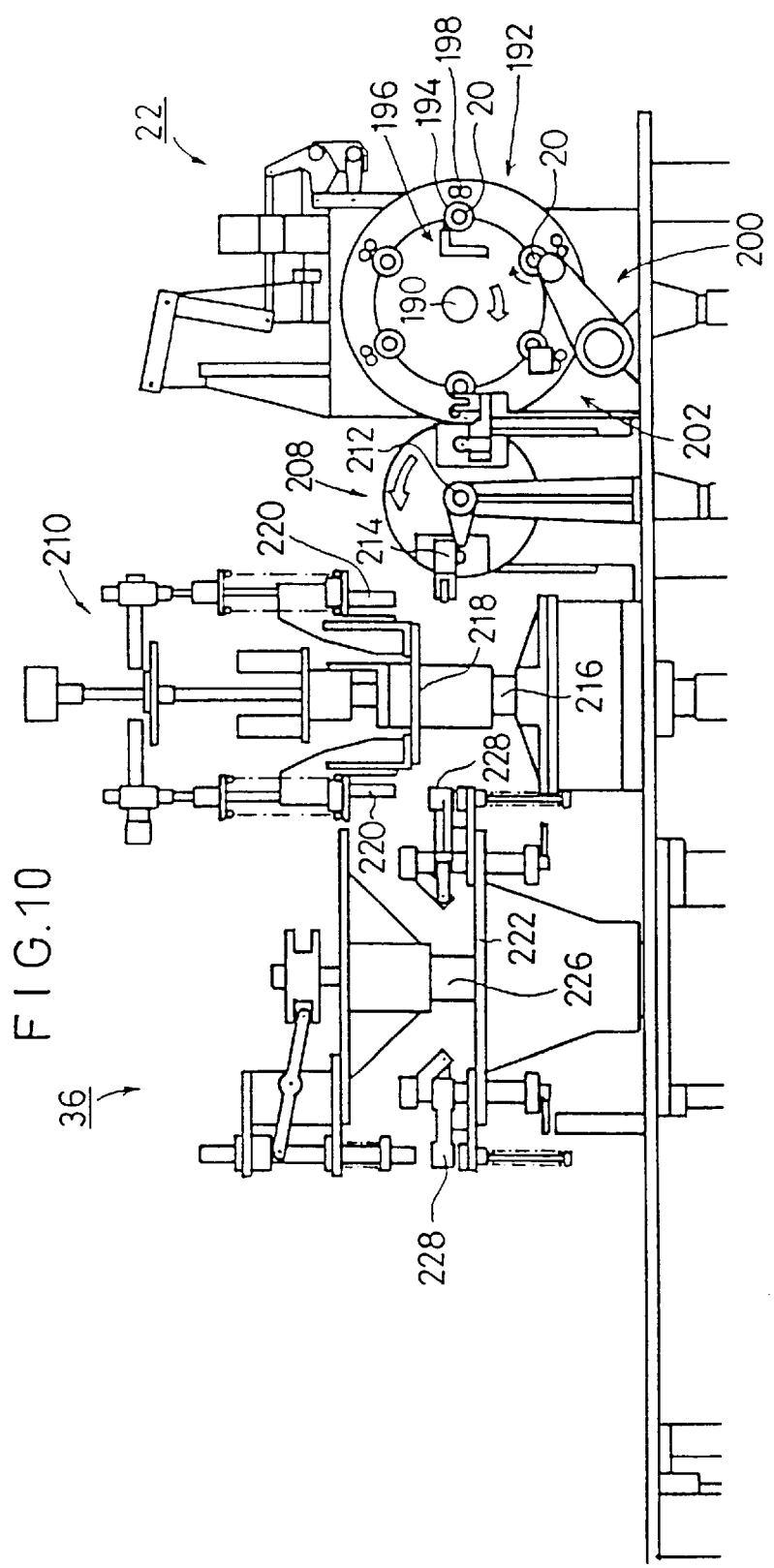
FIG. 10 is a side elevational view of a film coiling unit and an assembling unit of the film producing and packaging system.

As shown in FIGS. 4, 5, and 10, the film coiling unit 22 comprises a turntable 192 fixed to a main shaft 190 rotatable in the direction indicated by the arrow, a plurality of, e.g., six, spool chucks 194 mounted at equal angular intervals on the turntable 192, a spool positioner 196 for positioning spools 20 held by the spool chucks 194, a plurality of nip rollers 198 for pressing sized films 16 with their leading ends 16a inserted in the spools 20, a prewinder 200 for prewinding the sized films 16, and a winder 202 for winding the sized films 16 which have been prewound by the prewinder 200.

A first transfer unit 208 and a second transfer unit 210 are disposed downstream of the film coiling unit 22. The first transfer unit 208 receives a film coil 32, which comprises a sized film 16 wound on a spool 20, from one of the spool chucks 194, and converts the film coil 32 from a horizontal attitude to a vertical attitude while making a 180° turn about its own axis. The first transfer unit 208 comprises a rotatable shaft 212 and a holder 214 rotatable by the rotatable shaft 212 in the direction indicated by the arrow.

The second transfer unit 210 comprises a turntable 218 supported by a vertical rotatable shaft 216 and rotatable about a vertical axis by the vertical rotatable shaft 216. A plurality of vertically movable grips 220 are mounted on the turntable 218. The second transfer unit 210 inserts a film coil 32 received from the first transfer unit 208 into a single-open-ended cartridge 28 placed on an index table 222 of the assembling unit 36. The index table 222 is fixedly mounted on a vertical rotatable shaft 226 for indexing movement to angularly spaced positions. Chucks 228 are mounted on the index table 222 for positioning and holding single-open-ended cartridges 28 in respective stations (described below) corresponding to those angularly spaced positions. A discharge chute 230 (see FIG. 2) for discharging film coils 32 with defected films wound thereon is disposed near the second transfer unit 210.

Figure 11:
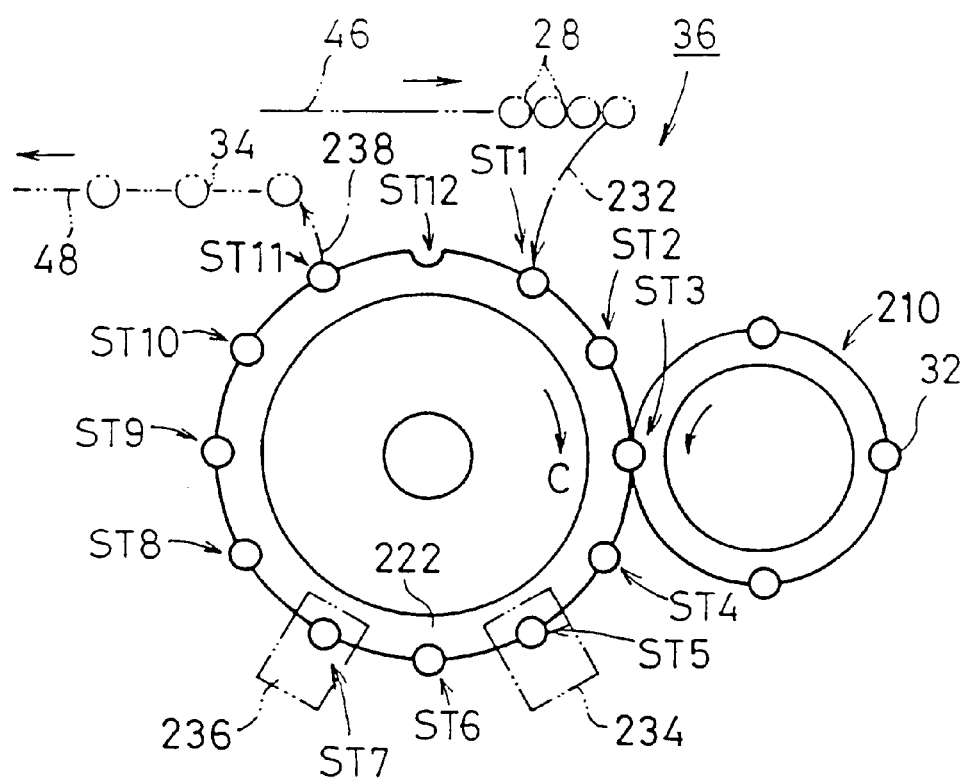
FIG. 11 is a schematic plan view of the assembling unit which carries out a resistance-to-pull inspecting process of the method of processing a photographic photosensitive film.

As shown in FIG. 11, the index table 222 can successively be indexed to a single-open-ended cartridge supply station ST1, a single-open-ended cartridge detecting station ST2, a film-wound spool inserting station ST3, a spool detecting and chuck opening station ST4, a cap supply station ST5, a chuck centering idle station ST6, a cap crimping station ST7, an idle station ST8, a cap height and torque detecting station ST9, a tongue (the trailing end 16c of a sized film 16) length detecting station ST10, a product unloading station ST1 for delivering an assembled cartridge 34 from the index table 222 to the second straight feed path 48, and a remaining cartridge detecting station ST12 for detecting whether an assembled cartridge 34 remains on the index table 222.

The single-open-ended cartridge supply station ST1 is associated with a loading unit 232 for loading a single open-ended cartridge 28 from the first straight feed path 46 onto the index table 222. The cap supply station ST5 is associated with a cap feed unit 234. The cap crimping station ST7 is associated with a pressing unit 236. The product unloading station ST11 is associated with an unloading unit 238 for unloading an assembled cartridge 34 from the index table 222 to the second straight feed path 48.

Figure 12:
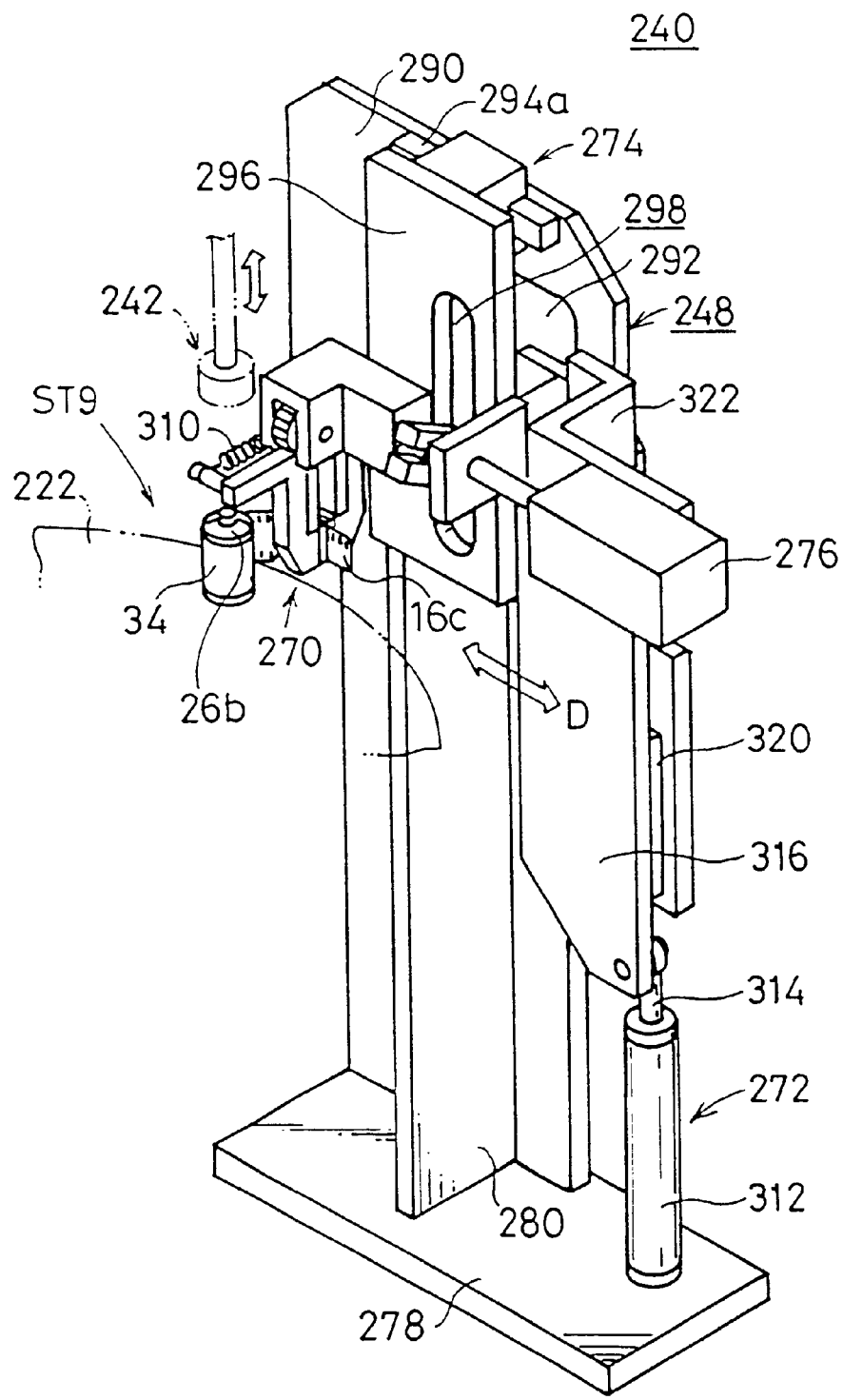
FIG. 12 is a perspective view of a resistance-to-pull inspecting device for carrying out the resistance-to-pull inspecting process.
Figure 13:
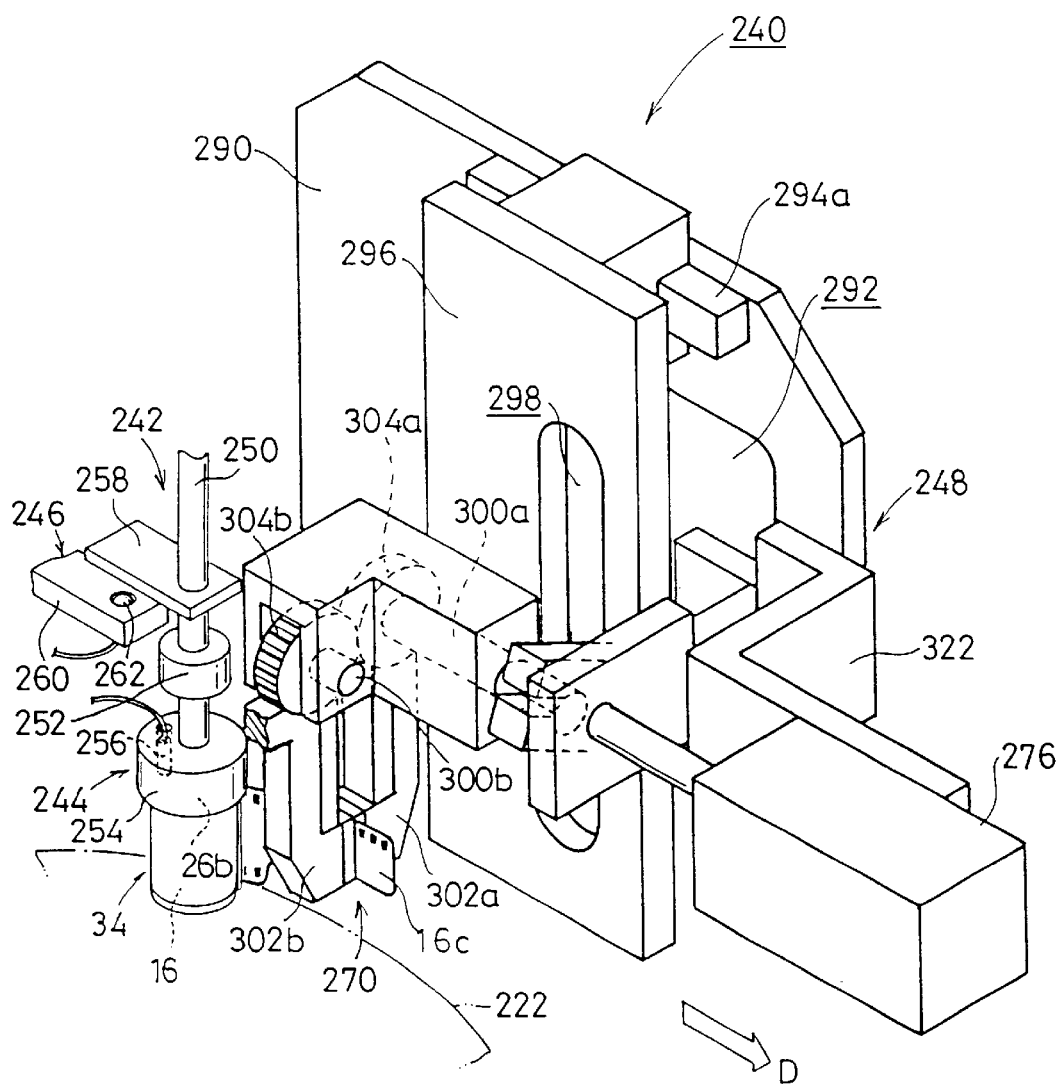
FIG. 13 is an enlarged perspective view of a portion of the resistance-to-pull inspecting device.

As shown in FIGS. 12 and 13, the cap height and torque detecting station ST9 has a pull resistance inspecting device 240. The pull resistance inspecting device 240 comprises a cartridge holding mechanism 242 for holding an assembled cartridge 34, a cap detecting mechanism 244 for detecting whether there is a cap 26b of an assembled cartridge 34, a height detecting mechanism 246 for detecting an increased height of the assembled cartridge 34 due to a crimping failure or the like of the cap 26b, and a pulling load detecting mechanism 248 for detecting a load needed when the trailing end 16c of a sized film 16 projecting from an assembled cartridge 34 is pulled out to a predetermined length, and determining that the assembled cartridge 34 is defective if the detected load is greater than a predetermined load.

Figure 14:
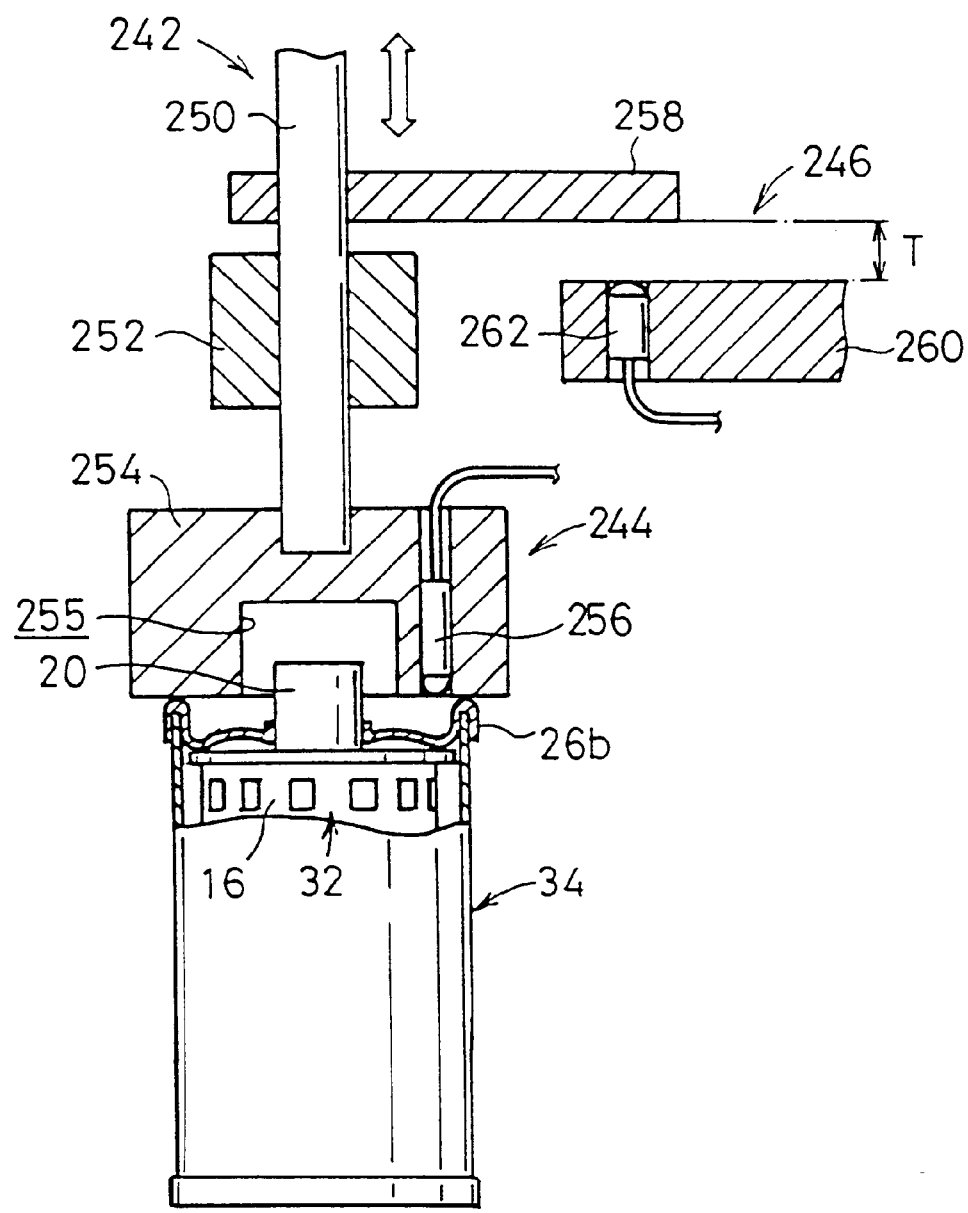
FIG. 14 is a vertical cross-sectional view of a cartridge holding mechanism, a gap detector, and a height detector of the resistance-to-pull inspecting device.

As shown in FIGS. 13 and 14, the cartridge holding mechanism 242 has a rod 250 vertically movable by a cam mechanism (not shown) and supported by a bearing 252. The rod 250 supports on its lower end a holder 254 for pressing and holding a cap 26b crimped on the upper end of an assembled cartridge 34. The holder 254 is of a substantially cylindrical shape and has a downwardly open central recess 255 for clearing the end of the spool 20 projecting upwardly from the assembled cartridge 34.

The cap detecting mechanism 244 comprises a proximity sensor 256 embedded in a peripheral region of the holder 254. The proximity sensor 256 serves to detect a cap 26b, which is made of metal, of the assembled cartridge 34.

To the rod 250, there is secured an end of a height detecting plate 258 whose opposite end is disposed above a reflective photosensor (distance sensor) 262 of the height detecting mechanism 246 which is embedded in a fixed block 260. The reflective photosensor 262 measures a distance T between itself and the height detecting plate 258 to decide whether the cap 26b suffers a crimping failure or not.

Figure 15:
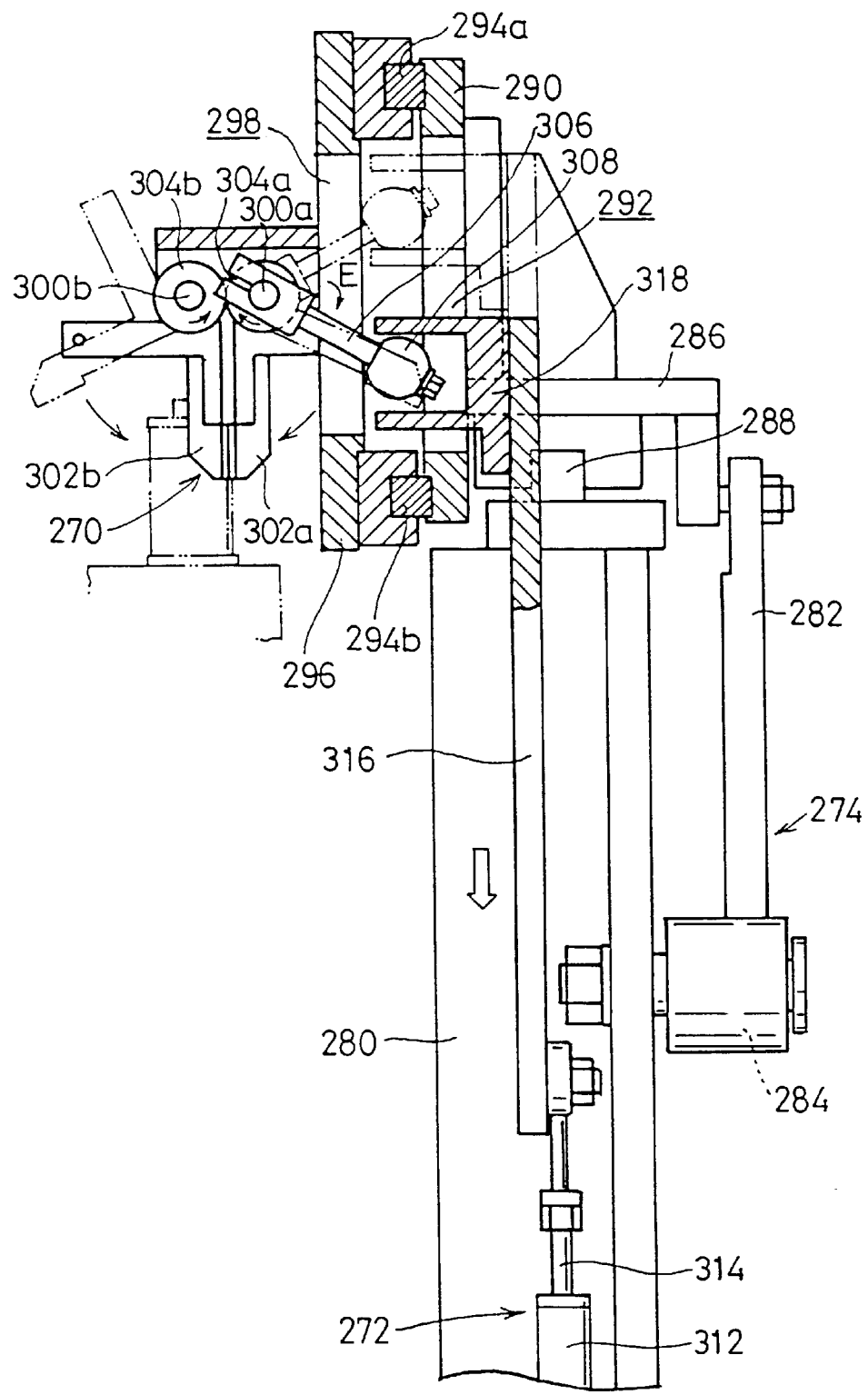
FIG. 15 is a side elevational view, partly in cross section, of a pulling load inspecting mechanism of the resistance-to-pull inspecting device.

As shown in FIGS. 12 and 15, the pulling load detecting mechanism 248 comprises a gripper 270 for gripping a film end 16c projecting from an assembled cartridge 34, an opening and closing unit 272 for opening and closing the gripper 270, a back-and-forth moving unit 274 for moving the gripper 270 gripping the film end 16c back and forth in the directions indicated by the arrow D, and a load cell 276 for detecting a pulling load exerted when the film end 16c is pulled from the assembled cartridge 34 by the gripper 270.

The pulling load detecting mechanism 248 has a base 278 on which a support frame 280 is vertically mounted. As shown in FIG. 15, the back-and-forth moving unit 274 includes a swing arm 282 having an end supported on the support frame 280 by a bearing 284. The swing arm 282 is angularly movable by a cam mechanism (not shown). A slide base 286 is held in engagement with an opposite end of the swing arm 282.

The slide base 286 is placed on a rail 288 mounted on the support frame 280 and extending in the directions indicated by the arrow D. A vertical attachment plate 290 is fixedly mounted on the slide base 286, and has a relatively large opening 292 defined therein. A pair of guide rails 294a, 294b extending in the directions indicated by the arrow D is fixed respectively to upper and lower edges of the attachment plate 290.

A movable plate 296 is supported on the guide rails 294a, 294b for back-and-forth movement in the directions indicated by the arrow D. The movable plate 296 has a vertical slot 298 defined therein. As shown in FIGS. 13 and 15, the gripper 270 comprises a pair of gripping fingers 302a, 302b mounted respectively on support shafts 300a, 300b that are rotatably supported on the movable plate 296. Gears 304a, 304b which mesh with each other are fixedly supported respectively on the support shafts 300a, 300b. An end of a swing rod 306 is fixed to an end of the support shaft 300a which is longer than the support shaft 300b. A ball 208 is fixed to the other end of the swing rod 306. The gripping fingers 302a, 302b have respective horizontal arms between which a coil spring 310 is connected, as shown in FIG. 12.

Figure 16:
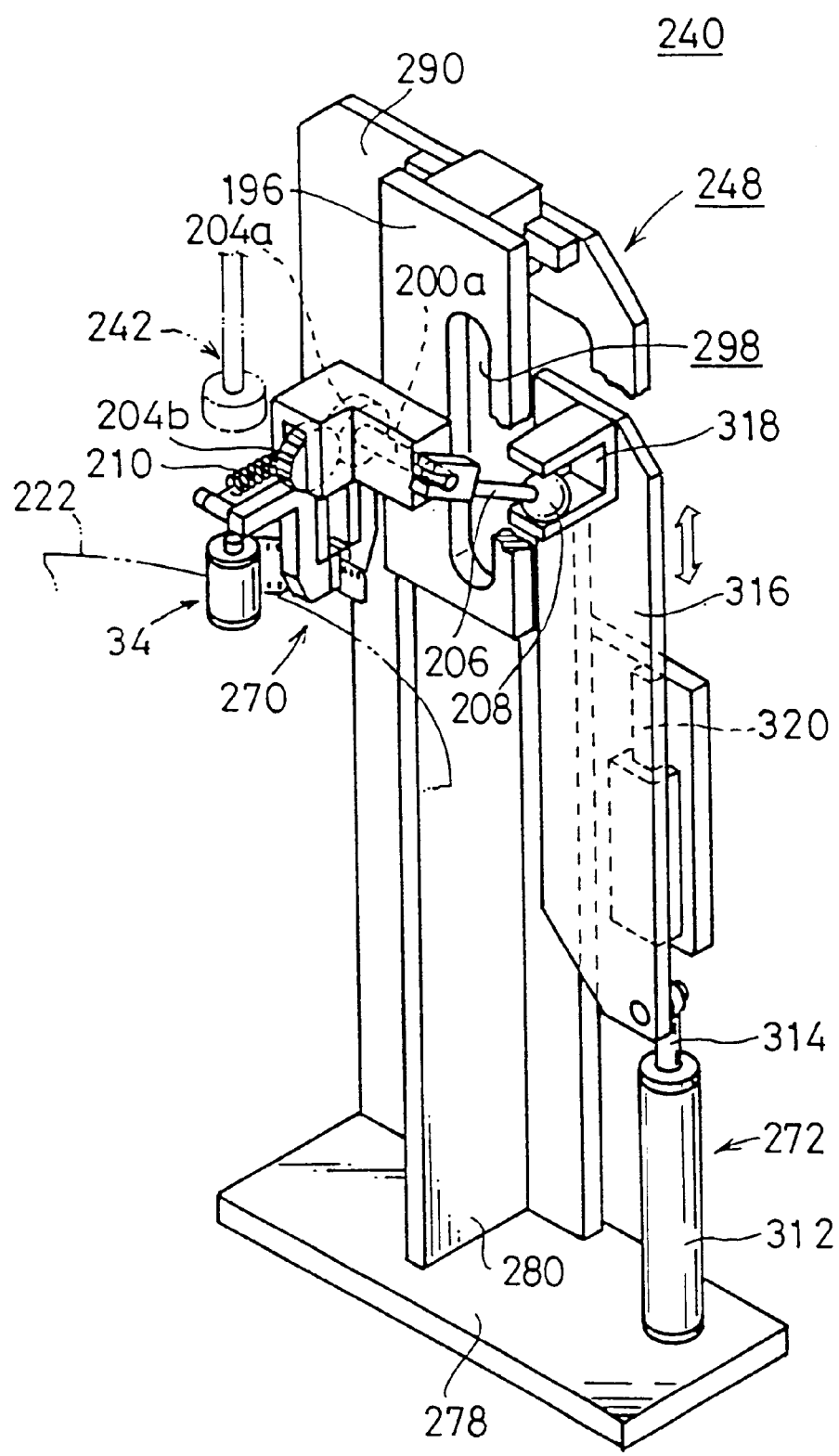
FIG. 16 is a perspective view, partly cut way, of the pulling load inspecting mechanism.

As shown in FIGS. 15 and 16, the opening and closing unit 272 comprises a cylinder 312 mounted on the base 278 and having an upwardly extending rod 314 whose upper end is coupled to a lower end of a vertically movable plate 316. A substantially C-shaped retainer 318 is fixed to an upper end of the vertically movable plate 316. The ball 208 is inserted in the retainer 318. The vertically movable plate 316 is vertically slidably supported on the support frame 280 by a guide rail 320.

As shown in FIG. 13, the load cell 276 is mounted on the vertical attachment plate 290 by an angle 322 and coupled to the movable plate 296. If a resistance detected by the load cell 276 immediately after the gripping fingers 302a, 302b pull the training end 16c of the sized film 16 out of the assembled cartridge 34 is 400 gf (first pulling load) or less, and a resistance detected by the load cell 276 after the gripping fingers 302a, 302b pull the training end 16c of the sized film 16 out of the assembled cartridge 34 by a predetermined length is 250 gf (second pulling load) or less, then the assembled cartridge 34 is determined as being accepted.

As shown in FIG. 2, the second straight feed path 48 extends from the dark room 44 into the bright room 45. At a terminal end of the second straight feed path 48, there is disposed a discharge chute 324 for automatically discharging a defective assembled cartridge 34a inspected in the assembling unit 36 without delivering it to the encasing unit 42.

As shown in FIG. 5, the encasing unit 42 comprises an index table 328 rotatable about its own axis for indexing movement to angularly spaced positions. The index table 328 can successively be indexed to a case supply station for supplying a case 38, a cartridge inserting station for inserting an assembled cartridge 34 into the case 38, a cartridge detecting station for detecting whether there is an assembled cartridge 34 or not, a case cap inserting station for inserting a case cap 40 into the open end of the case 38, a normal packaged product discharging station for discharging a normal packaged product 12, and a defective packaged product discharging station for discharging a defective packaged product 12.

Figure 17:
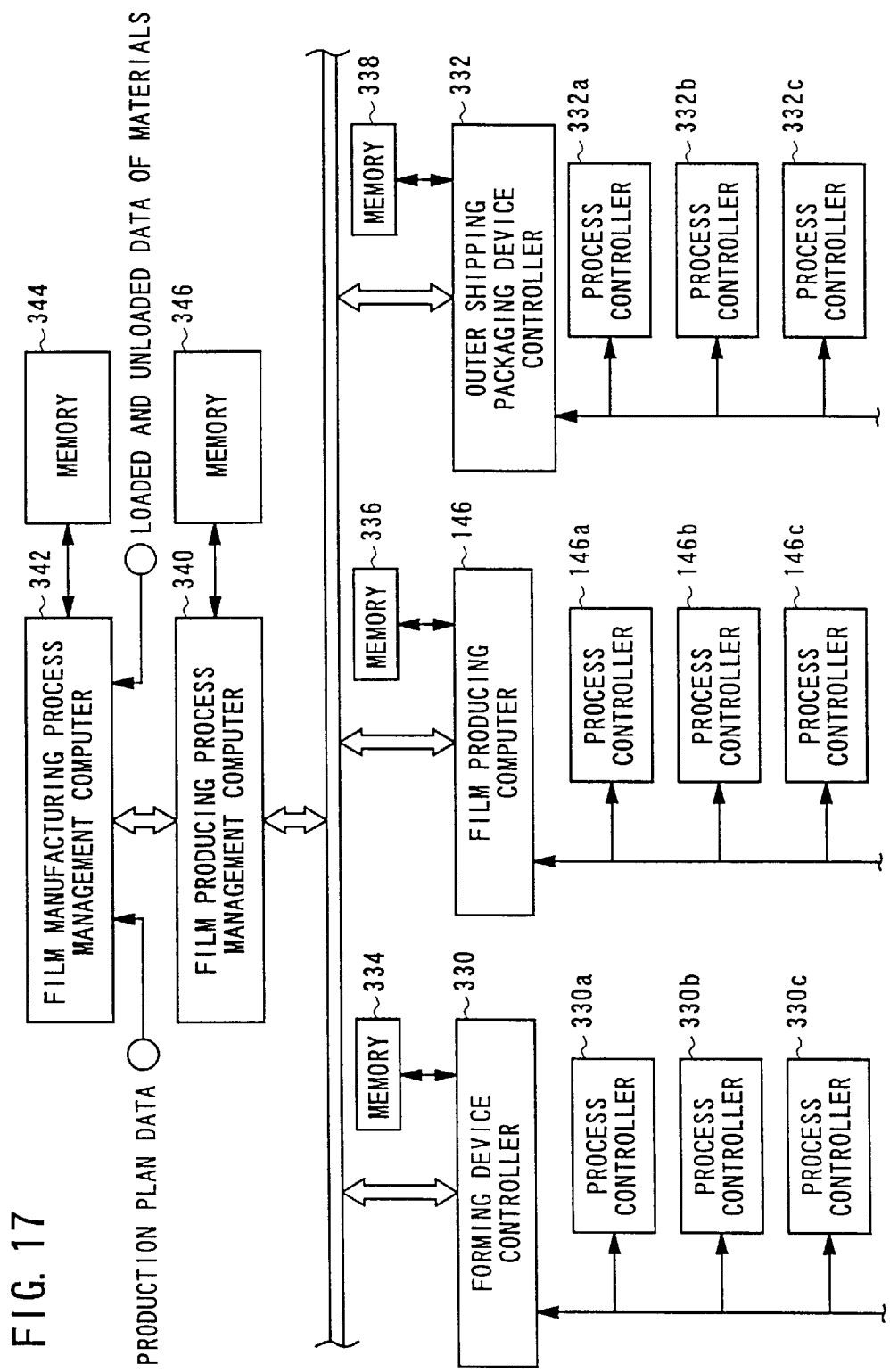
FIG. 17 is a block diagram of a in-factory network incorporating a film production controller for controlling the film producing and packaging system.

FIG. 17 shows an in-factory network which incorporates the film processing controller 146 for controlling the film producing and packaging system 10. The in-factory network includes a molding device controller 330, a film processing controller 146, and an outer shipping packaging device controller 332 as facility control computers which are individually controllable.

The forming device controller 330 sends commands to control process controllers 330a, 330b, 330c, . . . to control various processes for operating a forming device for forming cartridge blank sheets 24 under appropriate conditions.

The film processing controller 146 sends commands to control process controllers 146a, 146b, 146c, . . . to control a process of installing a film roll 14, inserting an assembled cartridge 34 into a case 38, and attaching a case cap 40 to produce a packaged product 12 or a process of producing a semifinished product which is an assembled cartridge 34.

The outer shipping packaging device controller 332 sends commands to control process controllers 332a, 332b, 332c, . . . to control a process of packing packaged products 12 in a small box, wrapping the small box with a cellophane sheet, or a process of packing a given number of small boxes storing packaged products 12 in a corrugated box.

The forming device controller 330, the film processing controller 146, and the outer shipping package device controller 332, have respective memories 334, 336, 338 which store production data obtained from the process controllers 330a, . . . 146a, . . . 332a, e.g., data indicative of the numbers of products and semifinished products, data indicative of the numbers of acceptable and defective products, and inspection data from process controllers for inspection processes.

The forming device controller 330, the film producing controller 146, and the outer shipping package device controller 332, which are facility management computers associated with respective facilities, are managed altogether by a film producing process management computer 340, which is managed by a film manufacturing process management computer 342, thus making up the in-factory network. The film producing process management computer 340 issues production instruction information individually to the forming device controller 330, the film processing controller 146, and the outer shipping packaging device controller 332, and gives instructions for setting up conditions for processing or inspecting processes in the production facilities, to those controllers.

The film manufacturing process management computer 342 is supplied with production plan data, and data of loading and unloading plans or loaded and unloaded data of materials (raw materials and parts). The production plan data is supplied to the film manufacturing process management computer 342 through the control console 66, a keyboard, or a recording medium such as a magnetic disk or the like, and stored in a memory 344. The data of loading and unloading plans or loaded and unloaded data of materials may be supplied to the film manufacturing process management computer 342 through the control console 66, a keyboard or a recording medium such as a magnetic disk or the like, and may also be supplied from the facility management computers.

A memory 346 of the film producing process management computer 340 stores as many prescription tables as the number of types of photographic film cartridges (photographic films stored in small boxes) to be manufactured. Each of these prescription tables is allotted an abbreviated product name indicative of the type of a product, and contains prescription data indicative of types of materials necessary to manufacture the photographic film cartridges of the type, manufacturing conditions, and inspecting conditions.

When the film manufacturing process management computer 342 is supplied with the production plan data, the film producing process management computer 340 generates a production instruction table. The production plan data comprise an order number, an abbreviated product name indicative of the type of a product to be manufactured, a planned number of products, etc. Based on the abbreviated product name contained in the production plan data, the film producing process management computer 340 searches the prescription tables, and reads all prescription data from the prescription table to which the abbreviated product name is assigned. The film producing process management computer 340 can now recognize a prescription type, a material type, material names, manufacturing conditions for operating the production facilities, and inspecting conditions therefor. If the film producing process management computer 340 confirms an inventory of materials, then the film producing process management computer 340 generates a production instruction table. The production instruction table contains a prescription type, the number of products, the names of materials to be used, manufacturing conditions, and inspecting conditions which are assigned with respect to the order number and the abbreviated product name. The items of the production instruction table include fixed items that are uniquely determined once a product type is determined and arbitrary items that can be changed. The fixed items include material names and numbers that are differently used depending on the product type, and these are automatically established. The arbitrary items include lot numbers of materials, and some manufacturing conditions and inspecting conditions, and these are arbitrarily established.

The production instruction table thus generated is stored altogether in the memory 346 of the film producing process management computer 340. Data of the names of materials used, their lot numbers, the manufacturing conditions, and the inspecting conditions in the production instruction table are classified for the respective production facilities by the film producing process management computer 340, and transmitted, together with the order number, the abbreviated product name, the prescription type, and the number of products, to the facility management computers which manage the production facilities. For example, control constants necessary to set up desired product types are transmitted to the film processing controller 146, which sets a perforating motor speed, a constant feed rate, and a full film length detecting setting to values depending on various product types and sizes upon product type changes.

As described above, the film producing process management computer 340 controls the facility management computers installed respectively in combination with the production facilities through the in-factory network, i.e., the forming device controller 330, the film processing controller 146, and the outer shipping packaging device controller 332, generates and stores production instruction data depending on production plan data, generates individual production instruction tables for the respective production facilities, and transmits the individual production instruction tables to the corresponding facility management computers.

Figure 18:
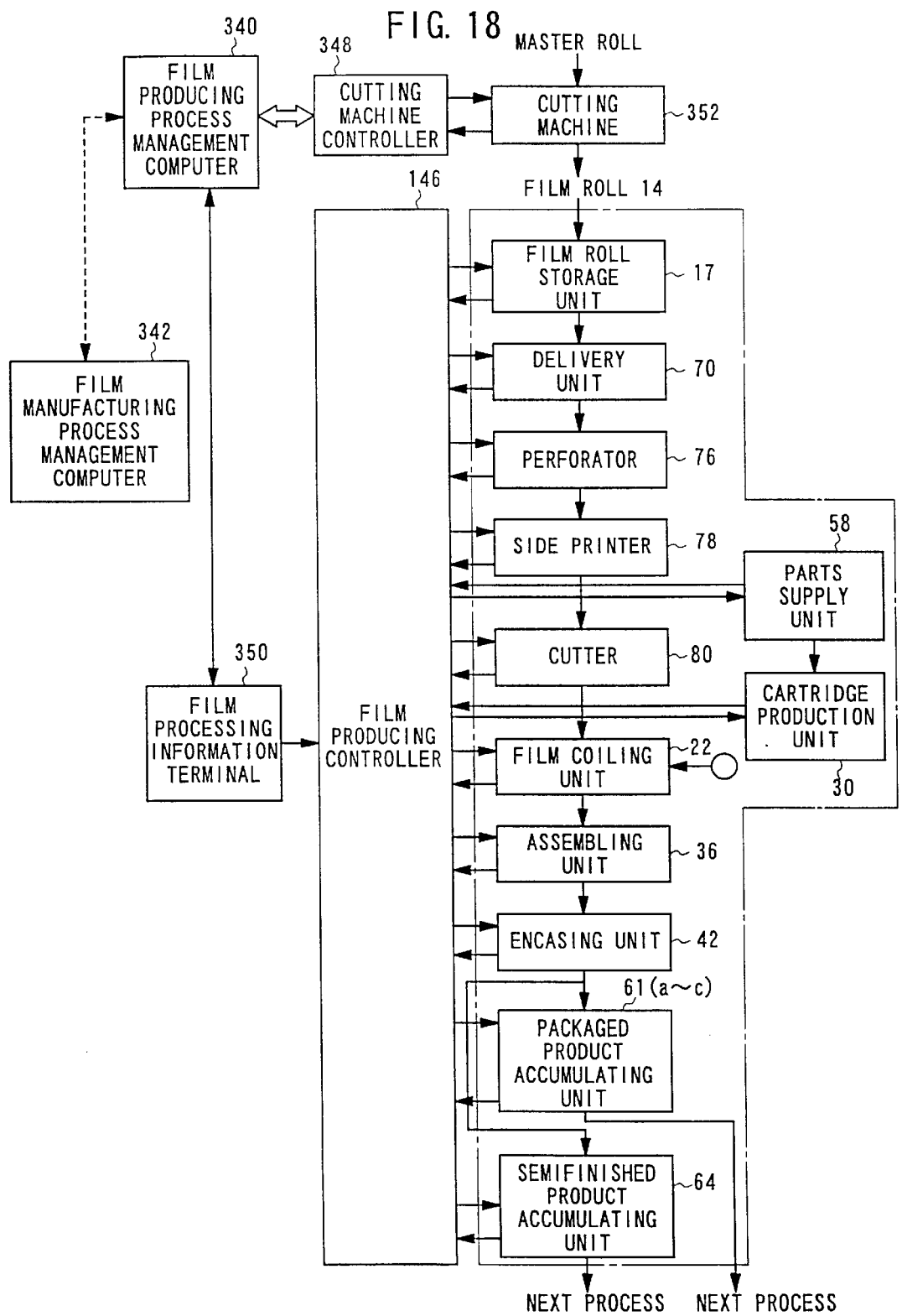
FIG. 18 is a block diagram of the in-factory network.

As shown in FIG. 18, the film producing process management computer 340 manages a cutting machine controller 348 which is used as a facility management computer for a production facility. The film producing process management computer 340 manages the film processing controller 146 through a film processing information terminal 350.

The cutting machine controller 348 transmits slitting conditions, e.g., established data of a feed speed of a master roll and inspecting conditions for a surface inspecting device in a cutting machine 352, to the cutting machine 352, thus indicating operating conditions for the cutting machine 352. When the cutting machine 352 is operated, the master roll is severed to the same width as sized films 16, thereby producing film rolls 14.

The film manufacturing process management computer 342 stores information as to defects generated in the film manufacturing process, e.g., information as to defects on a blank film caused by a photosensitive layer coating process, into the memory 344. The film producing process management computer 340 has a function as a cut film length number information converting means for converting the information as to defects on the blank film into information as to the number of cut film lengths from the leading end of an elongate film F unreeled from each film roll 14. The film processing controller 146 has a function as a counting means for counting cut film lengths when the film roll 14 is unwound, and a function as a control circuit for automatically discharging the elongate film F by a length corresponding to the converted number of cut film lengths if the number of counted cut film lengths agrees with the converted number of cut film lengths.

Operation of the film producing and packaging system 10 will be described below with respect to the method of processing a photographic photosensitive film according to the first embodiment of the present invention.

In a preparatory process carried out by the film producing and packaging system 10, a support base is coated with a photosensitive layer to produce a blank film. Defects produced on the blank film when the photosensitive layer is coated are detected by the surface inspecting device, and stored as film defect information into the memory 344 of the film manufacturing process management computer 342.

The film defect information supplied from the memory 344 to the film manufacturing process management computer 342 is transmitted to the film producing process management computer 340, which converts the film defect information into information as to the number of cut film lengths from the leading end of an elongate film F unreeled from each film roll 14 that is slitted to a given width of 35 mm, for example, from the blank film (master roll).

Specifically, transverse positions of defects on the blank film are stored as slitted positions, e.g., No. 1, No. 2, . . . , and longitudinal positions of the defects are stored as, for example, 100 m–200 m, 1200 m–1300 m. The film defect information is transmitted from the film manufacturing process management computer 342 to the film producing process management computer 340.

The film producing process management computer 340 converts the film defect information into cut film length numbers and the numbers of cut film lengths in the longitudinal direction depending on the numbers of exposures, e.g., 12 exposures, 24 exposures, and 36 exposures, etc. For example, when 1000 24-exposure sized films 16 are manufactured from a film roll 14, if 25th through 50th cut film lengths from the leading end of the film roll 14 are defective, then film defect information is stored as 25th through 50th cut film lengths.

The film producing process management computer 340 transmits the film defect information of each film roll 14 to the film processing information terminal 350. The film processing information terminal 350 stores the number of exposures to be produced per sized film, the cut film length number, and the number of cut film lengths, and sends these items of information to the film processing controller 146.

In the film supply unit 18, as shown in FIG. 4, the feeder 70 in the film supply unit 18 is operated to rotate the film roll 14 clockwise in the direction indicated by the arrow to deliver the leading end of the unreeled new elongate film F through the splicer 72 to the perforator 76. In the perforator 76, the suction chambers 96, 98 are evacuated to attract an upstream portion of the elongate film F between the feed roller 102 and the path roller 100, and also to attract a downstream portion of the elongate film F between the sprocket roller 104 and the path roller 106. The elongate film F is given a predetermined tension between the sprocket roller 104 and the feed roller 102. When the punch block 94 is vertically moved, perforations 74 are formed in opposite sides of the elongate film F by the punch block 94 in coaction with the die block 93.

Then, the feed roller 102 and the sprocket roller 104 are intermittently rotated by an indexing device (not shown) to feed the elongate film F intermittently. Thereafter, the punch block 94 is vertically moved to form perforations 74 in opposite sides of the elongate film F in coaction with the die block 93. The above perforating cycle is repeated to form a succession of perforations in opposite sides of the elongate film F at a constant pitch (see FIG. 1).

The perforated elongate film F is fed to the side printer 78 where latent images of strip-like prints depending on the film type are formed on one or both sides of the elongate film F by the first printing mechanism 112 (see FIGS. 4 and 5). The printed elongate film F forms a free loop between the path roller 110 and the sprocket 114, after which the second printing mechanism 116 above the sprocket 114 records a DX bar code, frame numbers, frame number bar codes, and a commercial name, depending on the film size as latent images on one or both sides of elongate films F.

The elongate film F which has passed through the side printer 78 is cut by the cutter 80 to form a leading end 16a of a sized film 16, and then fed in the direction indicated by the arrow B in FIG. 6 by a predetermined length corresponding to the number of exposures of the sized film 16, after which the elongate film F is stopped. Then, the first and second inspecting means 162, 164 of the film perforation position inspecting device 161 are energized.

Specifically, the first and second light-emitting elements 166, 168 of the first and second inspecting means 162, 164 apply the respective first and second inspecting beams L1, L2 to the passage S. The first inspecting beam L1 passes through a perforation 74 and is detected by the first light-detecting element 170, and the second inspecting beam L2 passes through another perforation 74 and is detected by the second light-detecting element 172.

The first light-detecting element 170 sends an ON signal to the decision means 184, and the second light-detecting element 172 also sends an ON signal to the decision means 184. The decision means 184 now determines that neither of the perforations 74 is located on the end 182.

If the perforations 74 are displaced from a predetermined cutting position for the elongate film F, then the decision means 184 receives a different signal or signals from the first and second light-detecting elements 170, 172. Operation of the decision means 184 based on supplied signals will be described in detail below with reference to FIG. 19 and Table 1 below.

TABLE 1

| Hole positions | Inspecting beam L1 | Inspecting beam L2 | Judgment |
| --- | --- | --- | --- |
| P1–P2 | OFF | OFF | NG |
| P2–P3 | ON | OFF | NG |
| P3–P4 | ON | ON | OK |
| P4–P5 | OFF | ON | NG |

Figure 19:
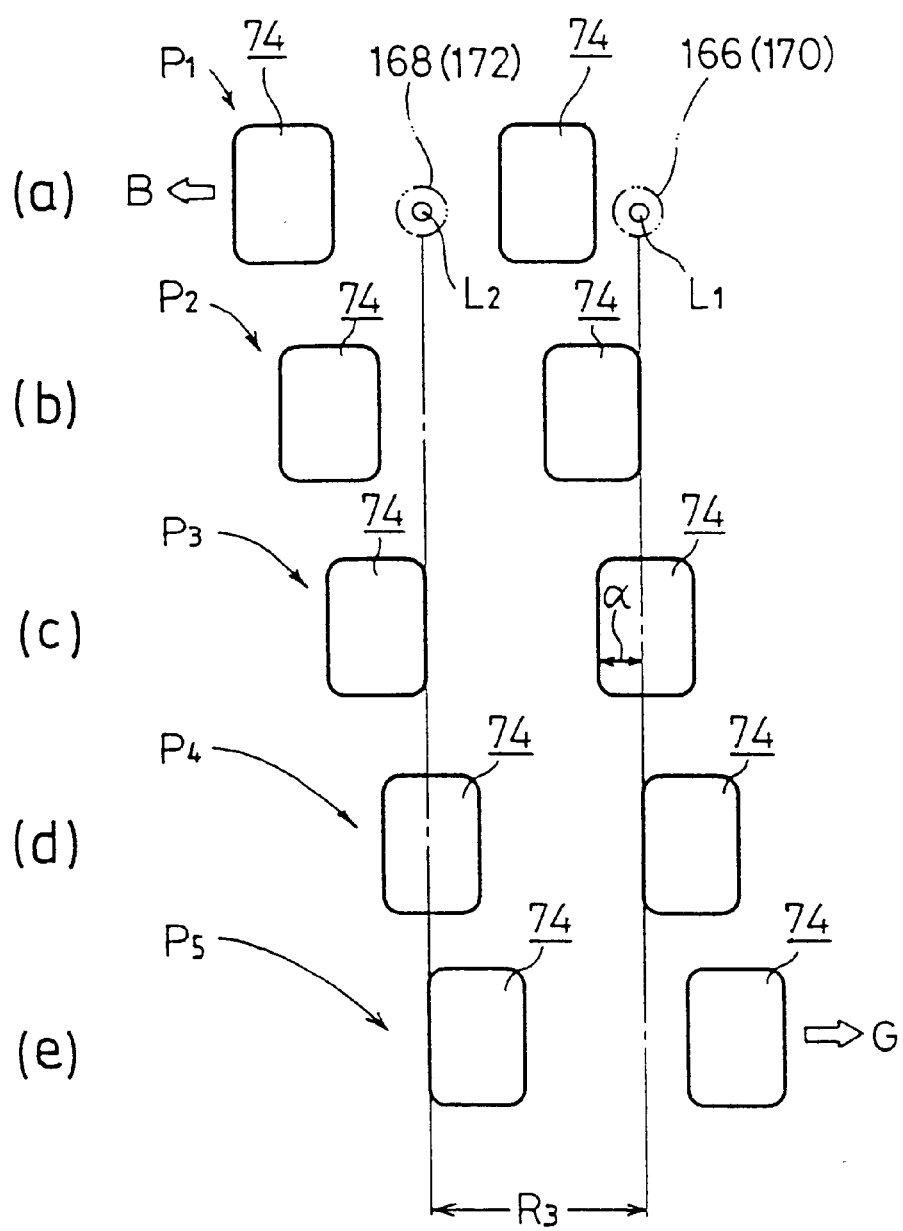
FIG. 19 is a diagram illustrative of the method of processing a photographic photosensitive film.

When the perforations 74 are displaced from a normal position within the distance α as indicated between a hole position P3 shown in FIG. 19 at (c) and a hole position P4 shown in FIG. 19 at (d), the first inspecting beam L1 passes through one of the perforations 74 and is detected by the first light-detecting element 170, and the second inspecting beam L2 passes through the other perforation 74 and is detected by the second light-detecting element 172. Therefore, the decision means 184 is supplied with ON signals from both the first and second light-detecting elements 170, 172, and determines that the positions of the perforations 170, 172 are OK, i.e., neither of the perforations 74 is located on the end 182.

When the perforations 74 are displaced from the normal position beyond the distance a in the direction indicated by the arrow B as indicated between a hole position P1 shown in FIG. 19 at (a), the first and second inspecting beams L1, L2 are positioned between the perforations 74 and blocked by the elongate film F. Therefore, the first and second inspecting beams L1, L2 are not applied to the first and second light-detecting elements 170, 172, which apply OFF signals to the decision means 184.

The above state is maintained until the perforations 74 are displaced to a position P2 shown in FIG. 19 at (b). Insofar as the perforations 74 in the inspecting position are located in a range between the hole positions P1, P2, the decision means 184 determines that the positions of the perforations 74 are NG, i.e., not acceptable. When the perforations 74 in the inspecting position are located in a range between the hole positions P2, P3, the first inspecting beam L1 passes through one of the perforations 74 and is detected by the first light-detecting element 170, and the second inspecting beam L2 is blocked by the elongate film F. Therefore, the decision means 184 is supplied with an ON signal from the first light-detecting means 170, and an OFF signal from the second light-detecting means 172. The decision means 184 determines that the positions of the perforations 74 are NG, i.e., not acceptable.

When the perforations 74 are largely displaced from the hole position P4 to a hole position P5 shown in FIG. 19 at (e) in the direction indicated by the arrow G (opposite to the direction indicated by the arrow B), the first inspecting beam L1 is blocked by the elongate film F, and the second inspecting beam L2 passes through one of the perforations 74 and is detected by the second light-detecting element 172. Therefore, the decision means 184 is supplied with an OFF signal from the first light-detecting means 170, and an ON signal from the second light-detecting means 172. The decision means 184 determines that the positions of the perforations 74 are NG, i.e., not acceptable.

The elongate film F is cut to a predetermined length by the movable blade 118 and the fixed blade 120 of the cutter 80, producing a sized film 16. When the elongate film F is thus cut off, the trailing end 16c of the sized film 16 which has been severed and the leading end 16a of a sized film 16 to be produced next time are processed. At the same time that the leading end 16a of the sized film 16 to be produced next time is processed, holes for engaging a spool are also formed in the leading end 16a.

A defective sized film 16 which is judged by the decision means 184 as having either perforation 74 located on the end 182 is automatically discharged while the NG signal is being shifted, as described later on.

The film processing controller 146 is counting film lengths cut from the elongate film F by the cutter 80, and comparing the counted number of cut film lengths with the stored film defect information. If the counted number of cut film lengths agrees with the stored film defect information, e.g., if the 25th cut film length is detected as being disposed in the cutter 80, then the openable and closable guide 124 is displaced away from the film feed path, and the discharge port 136 is moved onto the film feed path.

Then, an air blower (not shown) is actuated to cause the discharge port 136 to attract the elongate film F containing the defect. When the 50th cut film length, which is the trailing end of the defect on the elongate film F, reaches the cutter 80, the cutter 80 is actuated to sever the elongate film F, and the length of the elongate film F which contains the defect is automatically discharged through the discharge port 136.

The sized film 16 has its leading end 16a delivered into the film coiling unit 22. In the film coiling unit 22, as shown in FIGS. 5 and 10, a spool 20 is supplied to the spool chuck 194 on the turntable 192. Then, the main shaft 190 is intermittently rotated clockwise in the direction indicated by the arrow, causing the spool positioner 196 to position the spool 20. Upon further rotation of the turntable 192 in the direction indicated by the arrow, the leading end 16a of the sized film 16 is inserted into a groove 20a of the spool 20. The turntable 192 is further rotated, and the prewinder 200 is operated to rotate the spool 20. The sized film 16 whose leading end 16a engages the spool 20 is now prewound on the spool 20 to a predetermined length.

The turntable 192 is further rotated, and the winder 202 is operated to wind the sized film 16 on the spool 20, producing a film coil 32. After the film coil 32 is held by the holder 214 of the first transfer unit 208, the film coil 32 is angularly moved 900 from a horizontal attitude to a vertical attitude when the holder 214 turns 180°. The film coil 32 in the vertical attitude is gripped by the grips 220 of the second transfer unit 210. In the second transfer unit 210, the turntable 218 rotates in unison with the vertical rotatable shaft 216, bringing the film coil 32 gripped in the vertical attitude by the grips 220 to a standby position above the chuck 228 placed on the index table 222 of the assembling unit 36.

When the second transfer unit 210 receives a film coil 32 with a sized film 16 which has been judged as defective by the decision means 184, the second transfer unit 210 automatically discharges the defective film coil 32 through the discharge chute 230 based on an NO signal.

In the cartridge producing unit 30, a cartridge blank sheet 24 is rounded, and a cap 26a is fitted over an end of the rounded cartridge blank sheet 24, thus producing a single-open-ended cartridge 28. The single-opened-ended cartridge 28 is delivered along the first straight feed path 46 to the assembling unit 36. As shown in FIG. 11, the single-opened-ended cartridge 28 is transferred by the loading unit 232 to the single-opened-ended cartridge supply station ST1 on the index table 222. The index table 222 is intermittently rotated in the direction indicated by the arrow C to move the single-open-ended cartridge 28 from the single-open-ended cartridge supply station ST1 to the film-wound spool inserting station ST3, in which the film coil 32 is inserted into the single-open-ended cartridge 28 by the second transfer unit 210.

The single-open-ended cartridge 28 with the film coil 32 inserted therein is checked in the single-open-ended cartridge detecting station ST2 to detect where there is a trailing end 16c of a sized film 16 or not. Thereafter, the single-open-ended cartridge 28 with the film coil 32 inserted therein is fed to the spool detecting and chuck opening station ST4. The spool detecting and chuck opening station ST4 ascertains if the length of the trailing end 16c is positioned in a predetermined range or not to detect whether the film coil 32 is properly inserted in the single-open-ended cartridge 28 or not.

The single-open-ended cartridge 28 is then delivered to the cap supply station ST5. In the cap supply station ST5, a cap 26b delivered by the cap feed unit 234 is positioned in an upper open end of the single-open-ended cartridge 28. In the cap crimping station ST7, the cap 26b is pressed into the upper open end of the single-open-ended cartridge 28 by the pressing unit 236 and crimped in place, producing an assembled cartridge 34. The assembled cartridge 34 is then fed to the cap height and torque detecting station ST9. In the cap height and torque detecting station ST9, the cartridge holding mechanism 242, the cap detecting mechanism 244, the height detecting mechanism 246, and the pulling load detecting mechanism 248 are synchronously operated.

Figure 20A:
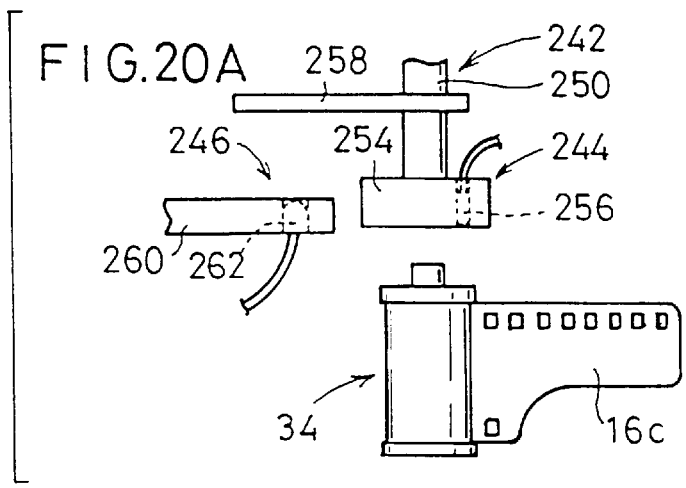
FIG. 20A is a view showing the manner in which the cartridge holding mechanism is disposed above a cartridge.
Figure 20B:
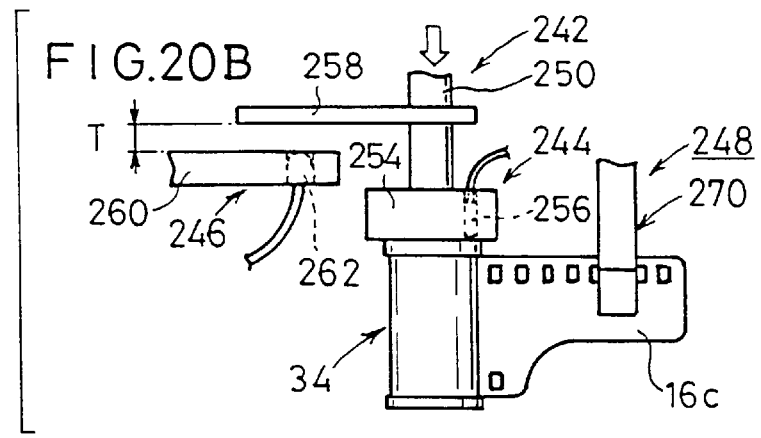
FIG. 20B is a view showing the manner in which the cartridge holding mechanism is lowered to the cartridge.

Specifically, as shown in FIG. 20A, when the assembled cartridge 34 is positioned in alignment with the cartridge holding mechanism 242, the rod 250 is lowered by the cam mechanism (not shown) until the holder 254 engages and holds the assembled cartridge 34 (see FIG. 20B). The proximity sensor 256 of the cap detecting mechanism 244, which is embedded in the holder 254, detects whether there is a cap 26b which is made of metal or not.

When the rod 250 is lowered, the height detecting plate 258 with one end fixed to the rod 250 is also lowered. The distance T between the height detecting plate 258 and the fixed block 260 is detected by the reflective photosensor 262 of the height detecting mechanism 246. If the height of the cap 26b is greater than a predetermined value due, for example, to a crimping failure of the cap 26b, then the distance T detected by the photosensor 262 differs from an reference value, so that a crimping failure of the cap 26b can be detected.

With the assembled cartridge 34 held by the cartridge holding mechanism 242, the pulling load detecting mechanism 248 is actuated. As indicated by the two-dot-and-dash lines in FIG. 15, the grips 302a, 302b of the gripper 270 are open, and the film end 16c of the assembled cartridge 34 is positioned in the gripper 270.

The cylinder 312 of the opening and closing unit 272 is operated to cause the rod 314 to lower the vertically movable plate 316. The ball 308 engaging the retainer 318 is swung in the direction indicated by the arrow E, causing the support shaft 300a connected to the swing rod 306 to turn in the direction indicated by the arrow E. The gear 304a fixedly mounted on the support shaft 300a causes the gear 304b meshing with the gear 304a to move the grips 302a, 302b angularly toward each other, i.e., in a closing direction, so that the tip ends of the grips 302a, 302b grip the film end 16c (see FIGS. 15 and 20B).

Figure 20C:
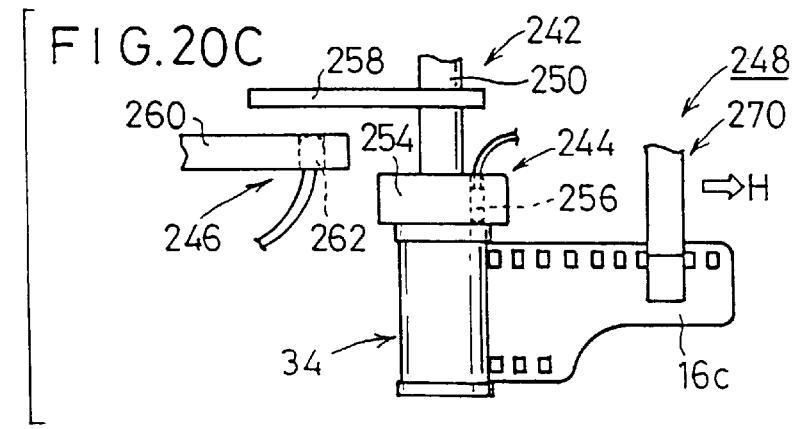
FIG. 20C is a view showing the manner in which a film end is drawn from the cartridge.
Figure 21:
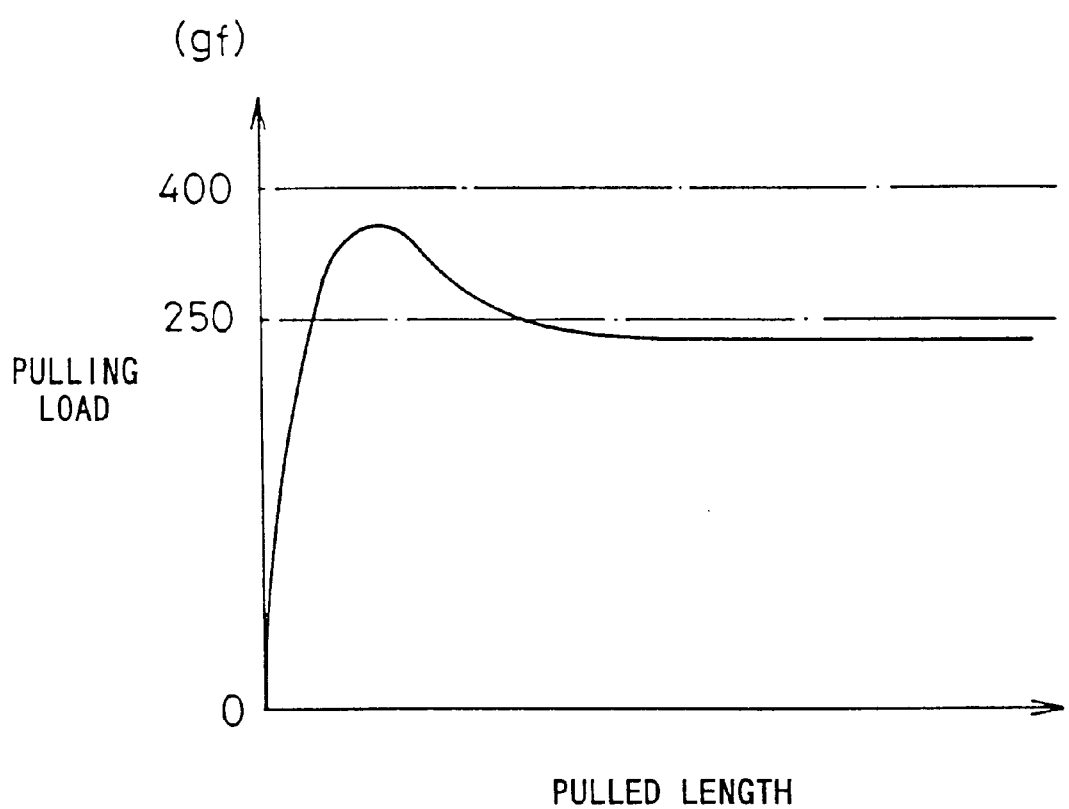
FIG. 21 is a diagram showing the relationship between the pulled length of the film end and the pulling load applied.

Then, the swing arm 282 of the back-and-forth moving unit 274 is swung by the cam mechanism (not shown), thereby moving the slide base 286 coupled to the distal end of the swing arm 282 in the direction indicated by the arrow H on the support frame 280 along the rail 288. The attachment plate 290 is fixedly mounted on the slide base 286, and the movable plate 296 is supported on the attachment plate 290 by the guide rails 294a, 294b. Therefore, when the attachment plate 290 is moved in the direction indicated by the arrow H, the gripper 270 as it grips the film end 16c is displaced in the direction indicated by the arrow H (see FIG. 20C).

At this time, a torque for pulling the film end 16c acts on the gripper 270, and the movable plate 296 on which the gripper 270 is mounted is displaced relatively to the attachment plate 290 along the guide rails 294a, 294b. The load cell 276 fixed to the attachment plate 290 by the angle 322 detects a pulling load on the film end 16c.

Immediately after the film end 16c is pulled out, there is developed a considerably large sliding resistance due to varying directions of fibers of a ribbon (not shown) mounted in the assembled cartridge 34. It is first inspected whether or not the pulling load on the film end 16c immediately after the film end 16c starts to be pulled out is 400 gf (first pulling load) or less. After the film end 16c is pulled out a certain length, since the sliding resistance imposed on the film end 16c by the ribbon is reduced, it is inspected whether or not the pulling load on the film end 16c is 250 gf (second pulling load) or less. The assembled cartridge 34 which is being inspected is judged as acceptable only when the pulling load on the film end 16c is 400 gf or less immediately after the film end 16c starts to be pulled out and the pulling load on the film end 16c is 250 gf or less after the film end 16c is pulled out by the certain length.

After the assembled cartridge 34 is inspected by the pull resistance inspecting device 240, the film end 16c is released from the gripper 270, and the rod 250 is lifted to release the holder 254 from the assembled cartridge 34. The assembled cartridge 34 is then delivered to the tongue length detecting station ST10, which detects whether the projecting length of the film end 16c falls within a predetermined range after the resistance to the pull on the film end 16c has been inspected.

The assembled cartridge 34 is delivered to the second feed path 48 by the unloading unit 238 (see FIG. 11). If the assembled cartridge 34 is judged as defective by the various inspecting processes in the assembling unit 36, then it is automatically discharged into the discharge chute 324 without being delivered to the encasing unit 42. If the assembled cartridge 34 is judged as accepted, then it is delivered from the second feed path 48 to the encasing unit 42.

In the encasing unit 42, a case 38 is delivered to the index table 328, and the assembled cartridge 34 is inserted into the case 38. Then, a case cap 40 is inserted into the open end of the case 38 in which the assembled cartridge 34 has been inserted, producing a packaged product 12. The packaged product 12 is fed onto the conveyor 62, from which it is introduced selectively into the packaged product accumulating units 61a, 61b, 61c.

If a failure occurs in the various facilities in the film supply unit 18, the failure is automatically detected, and a failure signal is supplied to the film processing controller 146. For example, a loop failure or a bottom-dead-center failure in the perforator 76 is detected by the first detecting means 152, a failure such as an encoder wire disconnection in the side printer 78 is detected by the second detecting means 154, and a path failure such as a tension roller position failure in the film feed path is detected by the third detecting means 156. Based on detected failure signals from these detecting means, the film processing controller 146 shuts off the film producing and packaging system 10.

Then, the operator checks and restores the facility which has failed, and manually discharges the elongate film F from the facility which has failed. Specifically, depending on the facility and its failure, the operator removes a length of the elongate film F which is defective from the facility and discards the removed length. When the operator restarts the film producing and packaging system 10, the film processing controller 146 controls the film producing and packaging system 10 to automatically discharges a length of the elongate film F which corresponds to a predetermined number of sized films from the discharge port 136.

When the photosensor 158 detects a bright condition in the dark room 44, the film producing process is interrupted. The length of the elongate film F prior to the cutter 80 is manually discarded by the operator, and all the elongate film F (and the sized films 16) existing in the facilities subsequent to the cutter 80 is automatically discharged. When the opening of a door by which the dark room 44 and the bright room 45 are connected is detected, the film producing process is interrupted, and the film is discharged. When a malfunction of a shutter mechanism (not shown) which separates the dark room 44 and the bright room 45 from each other is detected, the film producing process is interrupted. The operator then checks and restores the shutter mechanism, and manually discards a necessary length of the elongate film F. Thereafter, the film producing and packaging system 10 is restarted. At this time, a length of the elongate film F which corresponds to a predetermined number of sized films is automatically discharged.

As shown in FIG. 4, when the feeder 70 is operated to fully unreel the elongate film F from the film roll 14, the trailing end of the elongate film F is detected by the trailing end position detector 142. A new film roll 14 is set in the feeder 70, and the leading end of a new elongate film F is unreeled from the new film roll 14. In the splicer 72, the trailing end of the fully unreeled elongate film F is attracted to the splicing base 82, and the leading end of the new elongate film F supplied from the feeder 70 is attracted to the auxiliary base 84.

After the splicing tape 86 is wound around the application base 88, the cylinder 90 is actuated to lower the application base 88 and the tape cutter 92. The splicing tape 86 is now applied to the trailing end of the elongated film F on the splicing base 82 across a certain width. Then, the trailing end of the elongated film F is superimposed on and applied to the leading end of the new elongated film F attracted to the auxiliary base 84, with the splicing tape 86 interposed therebetween.

At this time, the film processing controller 146 controls the film producing and packaging system 10 to operate in a splicing discharge mode, and issues a command to discharge the spliced region (the splicing tape 86) of the trailing and leading ends of the elongate films F. Based on the command, the openable and closable guide 124 is moved away from the film feed path, and the elongate film F severed by the cutter 80 starts being drawn and discharged, from its leading end, into the discharge port 136.

When the spliced region of the new and old elongate films F is detected by the splicing detector 144 disposed upstream of the cutter 80, the new and old elongate films F are fed by a length corresponding to a predetermined number of sized films from the detected splicing region. The cutter 80 is actuated to cut off the elongate film F, and the severed elongate film F is discharged as a defective film including the spliced region from the discharge port 136.

The predetermined length of the new and old elongate films F ranging from the spliced region to the severed position varies depending on the number of exposures, e.g., 12 exposures, 24 exposures, or 36 exposures, and is set to twice the number of exposures.

After the film producing and packaging system 10 has started operating in the splicing discharge mode, if the spliced region of the new and old elongate films F is not detected by the splicing detector 144 within a predetermined discharge length that has been established depending on the number of exposures, then such a condition is judged as a malfunction, and the film producing and packaging system 10 is automatically shut off. The predetermined discharge length is equal to 10 sized films for 12 exposures, 7 sized films for 24 exposures, and 5 sized films for 36 exposures, for example.

According to the first embodiment, in the film producing and packaging system 10, when either one of the facilities suffers a failure, e.g., either one of the first, second, and third detecting means 152, 154, 156 detects a failure, the film processing controller 146 temporarily shuts off the film producing and packaging system 10. Then, the operator repairs the facility which has failed, and manually discharges a length of the elongated film F which is judged as made defective by the failure. When the operator restarts the film producing and packaging system 10, a length of the elongated film F equal to a preset number of sized films is automatically discharged with respect to the facility which has failed.

Therefore, the operator can quickly discard a desired film of the elongate film F which is likely to have been made defective by a facility failure. The process of discarding the defective length of the elongate film F is much quicker and easier than if the defective elongate film F were automatically discharged in its entirety.

After the defective length of the elongated film F is manually discarded by the operator, a length of the elongated film F which is equal to a preset number of sized films is automatically discharged. Consequently, any elongate film F which may possibly be defective will not remain in the film producing and packaging system 10. As a result, high-quality films are produced and packaged using acceptable, defect-free elongate films F.

The timer 160 is connected to the film processing controller 146 for measuring a time in which the film producing and packaging system 10 is shut off. If the measured time exceeds a predetermined time, then when the film producing and packaging system 10 is restarted, a length of the elongate film F which is equal to a preset number of sized films is automatically discharged. In this manner, a length of the elongate film F which may possibly have been flexed or bent is reliably discarded from the film producing and packaging system 10.

According to the first embodiment, furthermore, a defect produced on a blank film when the blank film is manufactured is stored by the film manufacturing process management computer 342, and the defect information is converted into information as to the number of cut film lengths as counted from the leading end of the elongate film F unreeled from the film roll 14. As the film roll 14 is unwound, film lengths cut from the elongate film F are counted. When the counted number of cut film lengths agrees with the converted number of cut film lengths, the position of the defect is identified. Therefore, the defect on the elongate film F can automatically and reliably be discharged through the discharge port 136.

According to the first embodiment, furthermore, the trailing end of the elongate film F which has fully been unreeled from the film roll 14 is detected by the trailing end position detector 142, and spliced to the leading end of an elongate film F to be newly unreeled by the splicer 72. Then, when the elongate film F upstream of the cutter 80 is discharged through the discharge port 136, the spliced region of the new and old elongate films F is detected by the splicing detector 144. Based on a detected signal from the splicing detector 144, the elongate film F is fed by a length corresponding to a preset number of sized films, and then severed by the cutter 80 and discharged through the discharge port 136. Consequently, the elongate film F including the spliced region can easily and reliably be discarded under simple control with a simple arrangement.

According to the first embodiment, as shown in FIG. 6, with the elongate film F fed a given length toward the cutter 80 and stopped at the cutting position, the first and second inspecting means 162, 164 are energized to apply the first and second inspecting beams L1, L2 to the passage S. Only when the first inspecting beam L1 passes through a perforation 74 and is detected by the first light-detecting element 170, and the second inspecting beam L2 passes through another perforation 74 and is detected by the second light-detecting element 172, the decision means 184 determines that neither one of the perforations 74 is located on the end 182.

Therefore, for cutting (trimming) the trailing end 16c of the sized film 16 with the cutter 80, it is possible to detect reliably whether perforations 74 are located on the end 182 of the trailing end 16c. Inasmuch as defective sized films 16 are automatically discharged without being delivered to the assembling unit 36, only assembled cartridges 34 containing defect-free sized films 16 can be produced. The outwardly projecting trailing ends 16c of these assembled cartridges 34 are not defective, and hence the percentage of defective assembled cartridges 34 which are produced is greatly reduced.

According to the first embodiment, the decision means 184 determines that the perforations 74 are properly positioned only when the first inspecting beam L1 passes through a perforation 74 and is detected by the first light-detecting element 170, and the second inspecting beam L2 passes through another perforation 74 and is detected by the second light-detecting element 172. When the first and second inspecting beams L1, L2 do not pass due to dust or dirt through the elongate film F, the decision means 184 always judges the elongate film F as unacceptable, but does not judge the elongate film F erroneously as acceptable. Consequently, packaged products 12 with defective sized films 16 contained therein will not be shipped from the film producing and packaging system 10.

Single-open-ended cartridges 28 manufactured from cartridge blank sheets 24 are highly expensive as unit components. Since the number of assembled cartridges 34 including single-open-ended cartridges 28 which are discarded is greatly reduced, the film producing process carried out by the film producing and packaging system 10 is highly economical.

According to the first embodiment, furthermore, the position of the perforations 74 is inspected on the basis of ON/OFF signals produced by the first and second inspecting means 162, 164 each comprising a photosensor. Accordingly, the film perforation position inspecting device 161 is effectively simple and small as a whole, and can be manufactured relatively inexpensively.

According to the first embodiment, the pull resistance inspecting device 240 has the cartridge holding mechanism 242, the cap detecting mechanism 244, the height detecting mechanism 246, and the pulling load detecting mechanism 248. When the assembled cartridge 34 is pressed and held by the cartridge holding mechanism 242 for pulling the film end 16c from the assembled cartridge 34 by the pulling load detecting mechanism 248, the cap detecting mechanism 244 and the height detecting mechanism 246 are actuated.

In synchronism with the operation of the cartridge holding mechanism 242 to press and hold the cartridge 34, the proximity sensor 256 detects whether there is a cap 26b or not, the reflective photosensor 262 inspects the cap 26b for a crimping failure or the like, and the pulling load detecting mechanism 248 detects a pulling load on the film end 16c. Consequently, the processes of detecting whether there is a cap 26b or not, inspecting the cap 26b for a crimping failure or the like, and detecting a pull resistance to the film end 16c are carried out substantially simultaneously in a single operation. Therefore, these inspecting processes are effected efficiently.

The proximity sensor 256 of the cap detecting mechanism 244 is embedded in the cartridge holding mechanism 242, and the height detecting mechanism 246 is combined with the cartridge holding mechanism 242. Thus, the pull resistance inspecting device 240 is highly simplified in overall arrangement.

The pulling load detecting mechanism 248 has the load cell 276 for detecting the pulling load on the film end 16c in two stages. Specifically, the load cell 276 detects whether the pulling load on the film end 16c is acceptable or not when the film end 16c is subjected to a sliding resistance (frictional resistance) imposed by the ribbon (not shown) in the cartridge 34 immediately after the film end 16c starts being pulled out, and also detects whether the pulling load on the film end 16c is acceptable or not when the film end 16c is pulled out by a given length and the sliding resistance imposed by the ribbon is reduced. As a result, it is possible to produce high-quality assembled cartridges 34.

A method of processing a film according to a second embodiment of the present invention will be described below with reference to FIGS. 4 and 5. The method according to the second embodiment is carried out by the film producing and packaging system 10.

When the trailing end of an elongate film F being delivered is detected by the trailing end position detector 142, the trailing end of the elongate film F is spliced to the leading end of a new elongate film F from a new film roll 14 by the splicer 72. At this time, the film processing controller 146 controls the film producing and packaging system 10 to operate in the splicing discharge mode, and issues a command to discharge the spliced region of the new and old elongate films F. Based on the command, the elongate film F is severed by the cutter 80 and then starts being drawn and discharged, from its leading end, into the discharge port 136.

Based on the detected signal from the trailing end position detector 142, the film processing controller 146 delivers the elongate film F by a predetermined discharge length depending on the number of exposures of sized films 16. The elongate film F is then severed by the cutter 80 and then discharged from the discharge port 136. The discharge length is equal to 10 sized films for 12 exposures, 7 sized films for 24 exposures, and 5 sized films for 36 exposures, for example. In the second embodiment, therefore, the elongate film F including the spliced region can easily and reliably be discarded under simple control with a simple arrangement.

After the film producing and packaging system 10 has started operating in the splicing discharge mode, if the spliced region of the new and old elongate films F is not detected by the splicing detector 144 within the predetermined discharge length that has been established depending on the number of exposures, then such a condition is judged as a malfunction, and the film producing and packaging system 10 is automatically shut off. Thus, the spliced region can be discarded more reliably.

A method of processing a film according to a third embodiment of the present invention will be described below with reference to FIG. 22 and Table 2. The method according to the third embodiment is carried out using the film perforation position inspecting device 161.

TABLE 2

| Hole positions | Inspecting beam L1 | Inspecting beam L2 | Judgment |
|---|---|---|---|
| –P10 | OFF | OFF | NG |
| P10–P11 | OFF | ON | OK |
| P11–P12 | ON | ON | NG |
| P12–P13 | ON | OFF | NG |

According to the third embodiment, the decision means 184 determines that neither of the perforations 74 is located on the end 182 only when the first inspecting beam L1 is block by the elongate film F, and the second inspecting beam L2 passes through a perforation 74.

Figure 22:
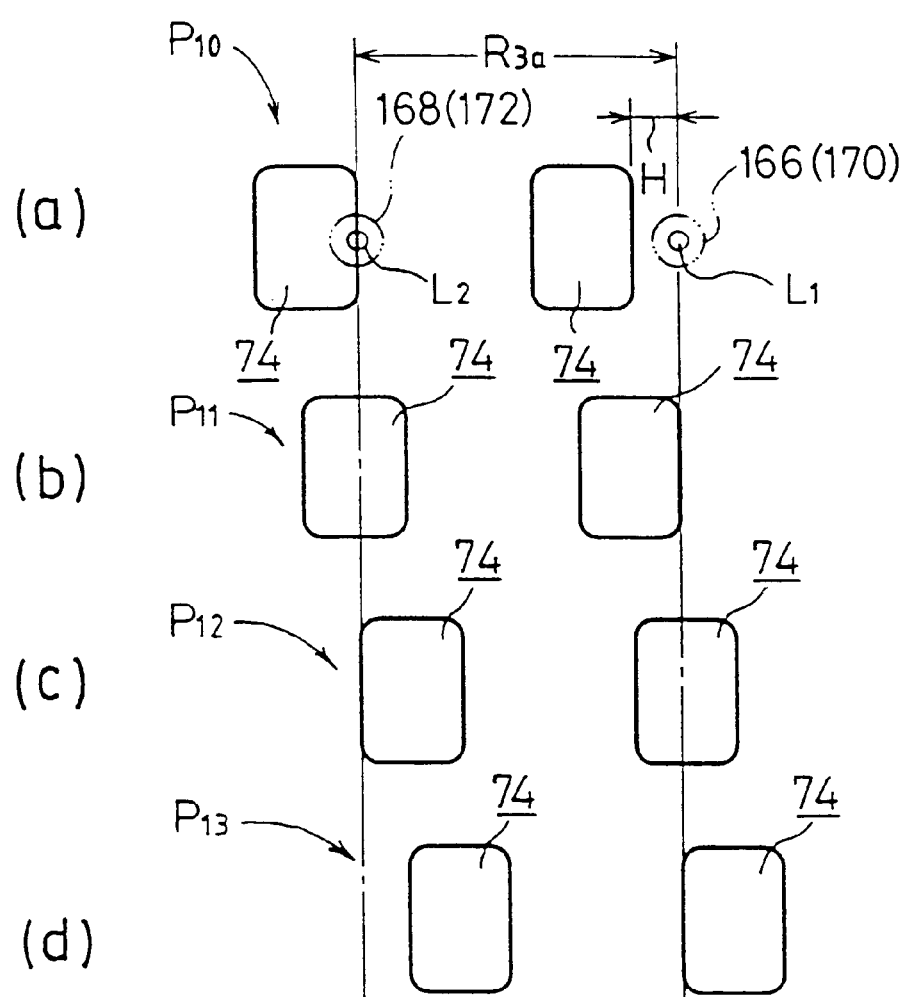
FIG. 22 is a diagram illustrative of a method of processing a photographic photosensitive film according to a third embodiment of the present invention.

According to the third embodiment, as shown in FIG. 22, the first and second inspecting beams L1, L2 are spaced from each other by a distance R3a of 4.75 n2+H mm where n2=3, H=1.2 mm.

When the perforations 74 are displaced from a normal position by a distance H or greater as indicated by a hole position P10 shown in FIG. 22 at (a), the first and second inspecting beams L1, L2 are blocked by the elongate film F, and are not applied to the first and second light-detecting elements 170, 172. Therefore, the decision means 184 is supplied with ON signals from both the first and second light-detecting elements 170, 172, and determines that the positions of the perforations 170, 172 are NG.

When the perforations 74 are located within a range from the hole position P10 to a hole position P11 shown in FIG. 22 at (b), the second inspecting beam L2 passes through one of the perforations 74 and is detected by the second light-detecting element 172, and the first inspecting beam L1 is blocked by the elongate film F. Therefore, the decision means 184 is supplied with an ON signal from the second light-detecting means 172, and an OFF signal from the first light-detecting means 170. The decision means 184 determines that the positions of the perforations 170, 172 are OK, i.e., neither of the perforations 74 is located on the end 182.

When the perforations 74 are located within a range from the hole position P11 to a hole position P12 shown in FIG.

22 at (c), the first inspecting beam L1 passes through one of the perforations 74 and is detected by the first light-detecting element 170, and the second inspecting beam L2 passes through another perforation 74 and is detected by the second light-detecting element 172. Therefore, the decision means 184 is supplied with ON signals from both the first and second light-detecting means 170, 172. The decision means 184 determines that the positions of the perforations 170, 172 are NG.

When the perforations 74 are located within a range from the hole position P12 to a hole position P13 shown in FIG. 22 at (d), the second inspecting beam L2 is blocked by the elongate film F, and the first inspecting beam L1 passes through one of the perforations 74 and is detected by the first light-detecting element 170. Therefore, the decision means 184 is supplied with an ON signal from the first light-detecting means 170, and an OFF signal from the second light-detecting means 172. The decision means 184 determines that the positions of the perforations 170, 172 are NG.

According to the third embodiment, therefore, the decision means 184 determines that neither of the perforations 74 is located on the end 182 only when the first inspecting beam L1 is block by the elongate film F, and the second inspecting beam L2 passes through a perforation 74. The third embodiment thus offers the same advantages as those of the first embodiment.

According to the present invention, as described above, in the event that the facilities of the film producing and packaging system suffer a failure, the operator repairs a failing facility and manually discharges a length of the photographic photosensitive film which may possibly be defective, after which a length of the photographic photosensitive film corresponding to a preset number of sized films is automatically discharged. The operator can thus more quickly and easily discharge the defective length of the photographic photosensitive film manually than if it were automatically discharged. When another length of the photographic photosensitive film is subsequently automatically discharged, the defective photographic photosensitive film is reliably discarded. Accordingly, it is possible to produce and package high-quality photographic photosensitive films.

Furthermore, after the trailing and leading ends of photographic photosensitive films are spliced, a length of the spliced photographic photosensitive film corresponding to a preset number of sized films is discharged on the basis of a detected signal representing the spliced region or a detected signal representing the trailing end. Consequently, the photographic photosensitive film including the spliced region can easily and reliably be discarded under simple control with a simple arrangement.

Moreover, with the photographic photosensitive film stopped in the cutting position, the first and second inspecting beams are applied to a perforated side edge of the photographic photosensitive film. It is judged whether either one of perforations is located in the cutting position by detecting whether the first and second inspecting beams pass through respective perforations in the photographic photosensitive film. Packaged products containing photographic photosensitive films in which perforations are located at severed ends thereof will be prevented from being shipped. Therefore, high-quality packaged products can efficiently be manufactured.

Furthermore, a process of inspecting whether a cap is mounted on a cartridge is carried out at the same time the cartridge is held in position for the purpose of pulling a film end from the cartridge. Consequently, this process and a process of inspecting a pull resistance to the film from the cartridge are conducted substantially simultaneously. The inspecting processes can thus be carried out efficiently.

Although certain preferred embodiments of the present invention have been shown and described in detail, it should be understood that various changes and modifications may be made therein without departing from the scope of the appended claims.

What is claimed is:

1. An apparatus for processing a film, comprising:
   a cartridge holding mechanism for holding a cartridge storing a photosensitive photographic film wound around a spool;
   a cap detecting mechanism mounted on said cartridge holding mechanism, for detecting whether a cap is mounted on said cartridge or not;
   a pulling load detecting mechanism for detecting a pulling load on a film end which is being pulled from said cartridge while said cartridge is being held by said cartridge holding mechanism thereby to inspect a resistance to pulling said film end,
   wherein said cap detecting mechanism and said pulling load detecting mechanism are situated so that said cap detecting mechanism and said pulling load detecting mechanism are both operative to act on said cartridge while said cartridge is held in one location.

2. An apparatus according to claim 1, wherein said cartridge holding mechanism comprises a holder for pressing and holding said cartridge, and said cap detecting mechanism comprises a proximity sensor embedded in said holder.

3. An apparatus according to claim 1, wherein said pulling load detecting mechanism comprises:
   gripping means for gripping said film end, said gripping means being movable in a direction to pull said film end from said cartridge; and
   a load cell for detecting the pulling load imposed on said film end when said film end is pulled from said cartridge by said gripping means.

4. An apparatus for processing a film, comprising:
   a cartridge holding mechanism which holds a cartridge storing a photosensitive photographic film wound around a spool;
   a height detecting mechanism which inspects a cap on said cartridge for a crimping while said cartridge is being held by said cartridge holding mechanism; and
   a pulling load detecting mechanism which detects a pulling load on a film end which is being pulled from said cartridge while said cartridge is being held by said cartridge holding mechanism thereby to inspect a resistance to pulling said film end, wherein said height detecting mechanism and said pulling load detecting mechanism are situated so that said height detecting mechanism and said pulling load detecting mechanism are both operative to act on said cartridge while said cartridge is held in one location.

5. An apparatus according to claim 4, wherein said pulling load detecting mechanism comprises:
   gripping means for gripping said film end, said gripping means being movable in a direction to pull said film end from said cartridge; and
   a load cell for detecting the pulling load imposed on said film end when said film end is pulled from said cartridge by said gripping means.

6. An apparatus according to claim 4, wherein said cartridge holding mechanism has a vertically movable rod, said height detecting mechanism comprising:

a detecting member fixed to said vertically movable rod; and a distance sensor disposed in a predetermined vertical position with respect to said detecting member, for detecting a distance from said detecting member.

7. An apparatus for processing a film, comprising:

a cartridge holding mechanism for holding a cartridge storing a photosensitive photographic film wound around a spool;

a cap detecting mechanism mounted on said cartridge holding mechanism, for detecting whether a cap is mounted on said cartridge or not;

a height detecting mechanism for inspecting said cap for a crimping while said cartridge is being held by said cartridge holding mechanism; and a pulling load detecting mechanism for detecting a pulling load on a film end which is being pulled from said cartridge while said cartridge is being held by said cartridge holding mechanism thereby to inspect a resistance to pulling said film end, wherein said cap detecting mechanism and said height detecting mechanism are situated so that said cap detecting mechanism and said height detecting mechanism are both operative to act on said cartridge while said cartridge is held in one location.

8. An apparatus according to claim 7, wherein said pulling load detecting mechanism comprises:

gripping means for gripping said film end, said gripping means being movable in a direction to pull said film end from said cartridge; and a load cell for detecting the pulling load imposed on said film end when said film end is pulled from said cartridge by said gripping means.

9. An apparatus according to claim 7, wherein said cartridge holding mechanism has a vertically movable rod, said height detecting mechanism comprising:

a detecting member fixed to said vertically movable rod; and a distance sensor disposed in a predetermined vertical position with respect to said detecting member, for detecting a distance from said detecting member.

10. An apparatus for processing a film, comprising:

a cartridge holding mechanism which holds a cartridge storing a photosensitive photographic film wound around a spool;

a height detecting mechanism which inspects a cap on said cartridge for a crimping while said cartridge is being held by said cartridge holding mechanism; and a pulling load detecting mechanism which detects a pulling load on a film end which is being pulled from said cartridge while said cartridge is being held by said cartridge holding mechanism thereby to inspect a resistance to pulling said film end, wherein said cartridge holding mechanism has a vertically movable rod, and said height detecting mechanism comprises, a detecting member fixed to said vertically movable rod; and a distance sensor disposed in a predetermined vertical position with respect to said detecting member, which detects a distance from said detecting member.

* * * * *